United States Patent
Matsuda

(10) Patent No.: US 8,020,087 B2
(45) Date of Patent: Sep. 13, 2011

(54) PROGRAM, INFORMATION PROCESSING METHOD, AND INFORMATION PROCESSING APPARATUS FOR INDICATING A SEARCH TERM IN ACCORDANCE WITH A USER OPERATION

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1177 days.

(21) Appl. No.: 11/738,668

(22) Filed: Apr. 23, 2007

(65) Prior Publication Data

US 2007/0279431 A1  Dec. 6, 2007

(30) Foreign Application Priority Data

Apr. 27, 2006  (JP) ................. 2006-123480

(51) Int. Cl.
*G06F 17/00* (2006.01)
*G06F 17/22* (2006.01)
*G06F 17/24* (2006.01)
*G06F 3/048* (2006.01)

(52) U.S. Cl. ........ 715/210; 715/224; 715/232; 715/780; 715/816

(58) Field of Classification Search .................. 715/210, 715/224, 232, 780, 816
See application file for complete search history.

(56) References Cited

U.S. PATENT DOCUMENTS

| | | | | |
|---|---|---|---|---|
| 6,032,156 A * | 2/2000 | Marcus | ................. | 1/1 |
| 6,421,685 B1 * | 7/2002 | Nishikawa | ............. | 1/1 |
| 6,654,025 B1 * | 11/2003 | Kaczowka | ..................... | 345/592 |
| 6,834,276 B1 * | 12/2004 | Jensen et al. | ........................ | 1/1 |
| 7,225,410 B2 * | 5/2007 | Kimmo et al. | ................ | 715/748 |
| 7,617,445 B1 * | 11/2009 | Townsend et al. | ............ | 715/232 |
| 2002/0138529 A1 * | 9/2002 | Yang-Stephens et al. | .... | 707/530 |
| 2002/0165707 A1 * | 11/2002 | Call | ................................ | 704/2 |
| 2005/0165753 A1 * | 7/2005 | Chen et al. | ......................... | 707/3 |
| 2005/0267872 A1 * | 12/2005 | Galai et al. | ........................ | 707/3 |
| 2006/0129552 A1 * | 6/2006 | Yang et al. | ........................ | 707/5 |
| 2006/0149720 A1 * | 7/2006 | Dehlinger | ......................... | 707/3 |
| 2006/0218492 A1 * | 9/2006 | Andrade | ....................... | 715/523 |
| 2006/0259475 A1 * | 11/2006 | Dehlinger | ......................... | 707/3 |

FOREIGN PATENT DOCUMENTS

| | | |
|---|---|---|
| JP | 8-255163 | 10/1996 |
| JP | 10-39981 | 2/1998 |
| JP | 2004-84879 | 3/2004 |
| JP | 2004-200866 | 7/2004 |
| JP | 2005-84879 | 3/2005 |
| JP | 2005-269149 | 9/2005 |
| WO | WO 03/032631 A1 | 4/2003 |

\* cited by examiner

*Primary Examiner* — Doug Hutton
*Assistant Examiner* — Soumya Dasgupta
(74) *Attorney, Agent, or Firm* — Oblon, Spivak, McClelland, Maier & Neustadt, L.L.P.

(57) ABSTRACT

An information processing apparatus for indicating a search term in accordance with a user operation assigns an operating element of an operation input device to a search term having been input and displays an information image containing the search term on a screen on the basis of search processing using the search term. The information processing apparatus also indicates a position of the search term in the information image when operation information on the operating element assigned to the search term is input while the displaying is being performed. Therefore, a user can check where a search term is located in a displayed page using a variety of operation input devices.

12 Claims, 18 Drawing Sheets

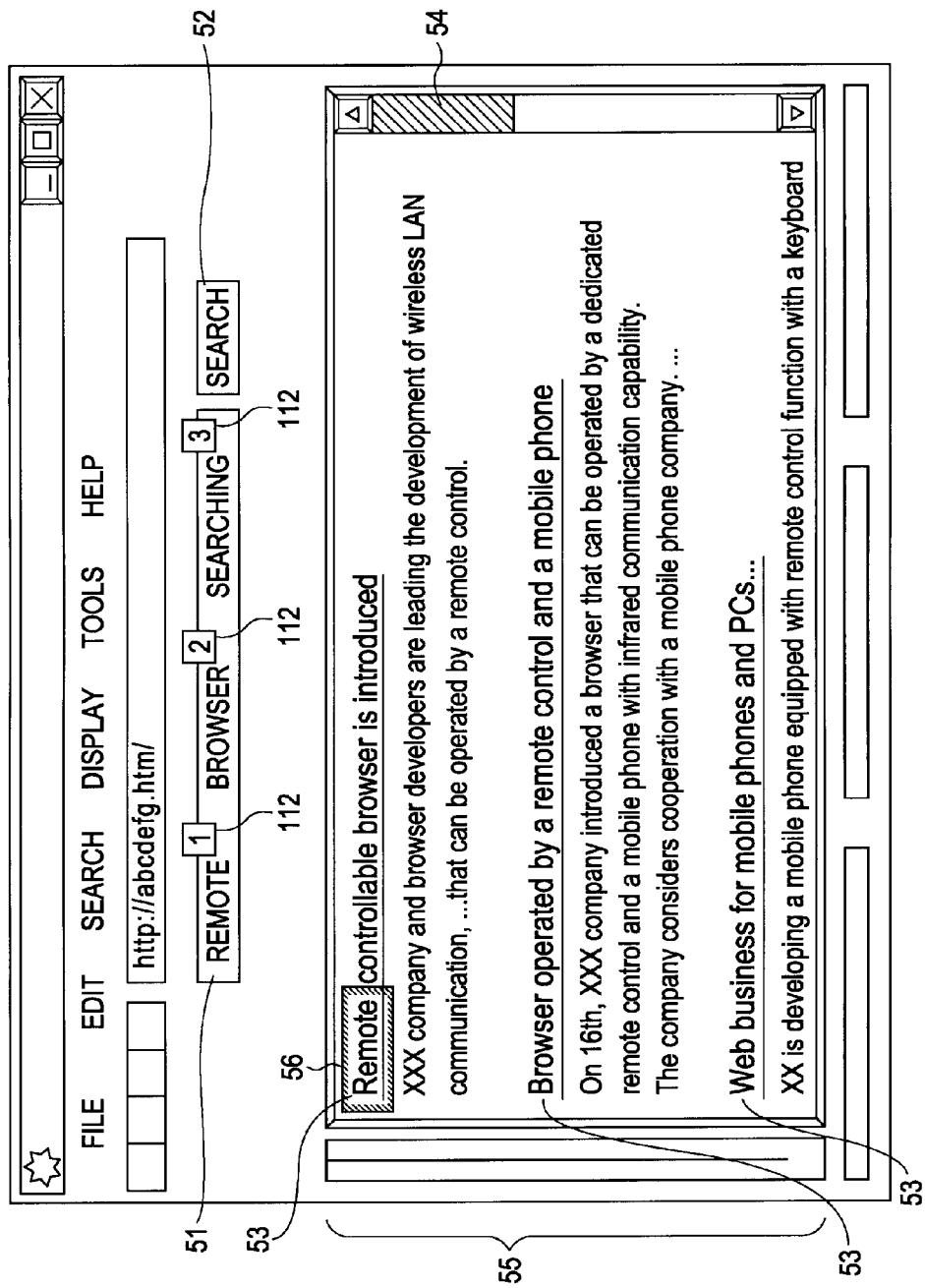

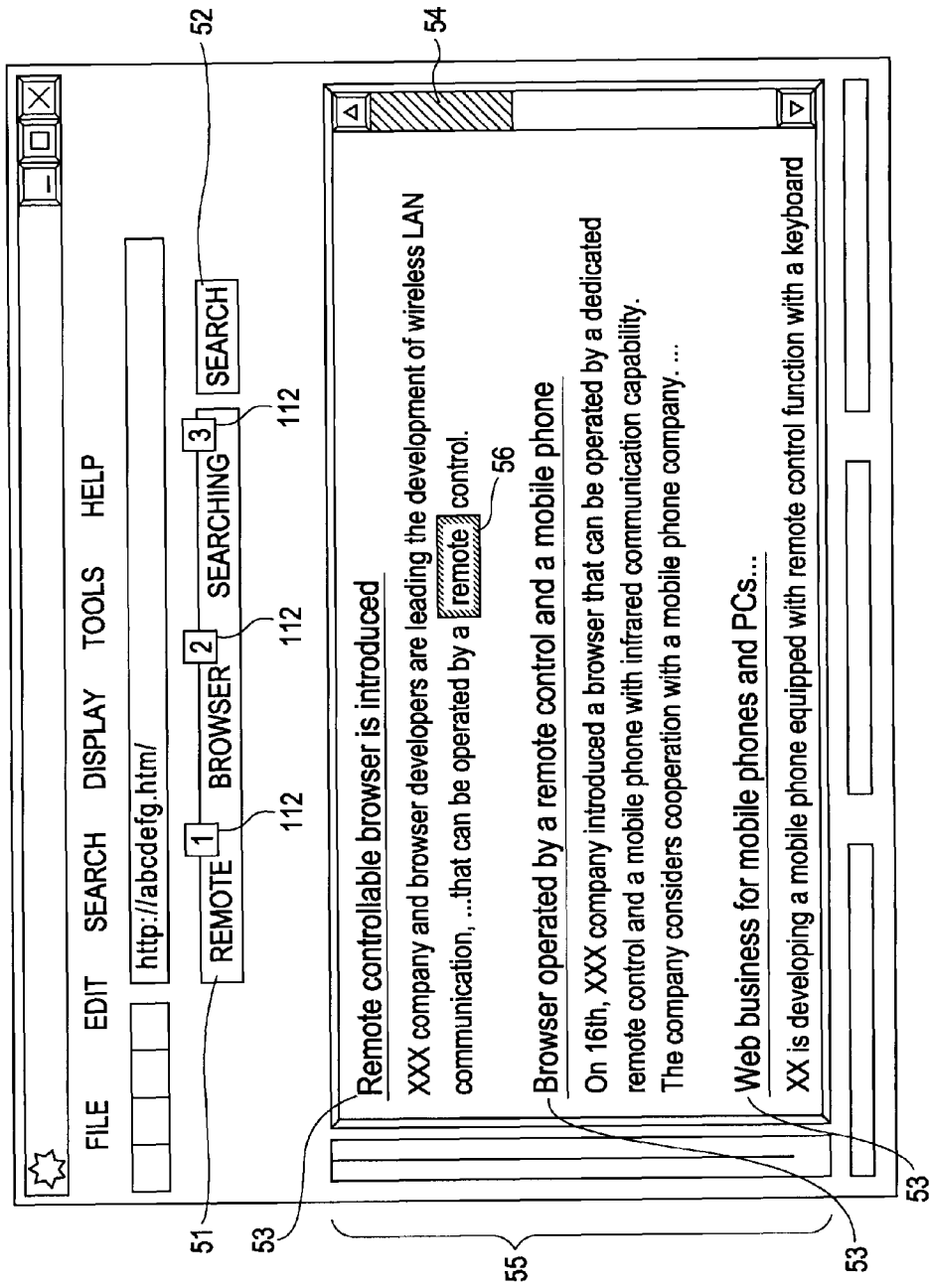

PROGRAM, INFORMATION PROCESSING METHOD, AND INFORMATION PROCESSING APPARATUS FOR INDICATING A SEARCH TERM IN ACCORDANCE WITH A USER OPERATION

CROSS REFERENCES TO RELATED APPLICATIONS

The present invention contains subject matter related to Japanese Patent Application JP 2006-123480 filed in the Japanese Patent Office on Apr. 27, 2006, the entire contents of which are incorporated herein by reference.

BACKGROUND OF THE INVENTION

1. Field of the Invention

The present invention relates to a program, an information processing apparatus, and an information processing method for indicating a search term in accordance with a user operation, in an information image displayed on the basis of search processing.

2. Description of the Related Art

Today, with the widespread use of the Internet, software (browser) for viewing information on the Internet is used in various environments. In general, a mouse is used for easy access to information viewed on a personal computer.

In recent years, techniques have been developed which implement browser functions in electronic apparatuses, such as television receivers, audio-visual apparatuses, and mobile phones, as well as personal computers. With these techniques, users are allowed to view website information on the Internet.

When users view information such as website information on the Internet displayed through browser functions, the users operate display screens and designate links by moving cursors up and down, clicking links, and so forth. However, in the case where the users use browser functions implemented in television receivers or the like and thus operating devices such as mice and keyboards for personal computers are not available, the users have to perform various operations for browsing using several keys provided on remote controllers, for example.

A technique related to the above operations is disclosed in Japanese Unexamined Patent Application Publication No. 2004-200866.

Among browser functions, one of the most frequently used functions is a website search function using the Internet. When a user uses such a website search function, the user accesses a search engine site and enters a word (search term) in a search term field provided in a page of the search engine site. In response to the search term entry, a search through the search engine is carried out, and as a result an image representing a list of web pages that contain the search term is displayed.

If the user selects (clicks) any one of the web pages from the list, the browser function accesses the selected web page and loads the image of the web page to be displayed.

In such a case, the user often desires to know where the entered search term is included in the image of the web page list of the search result or in the image of the selected web page.

However, users often feel inconvenience in performing browsing operations for finding search terms in an image by using remote controllers of television receivers, keys on the housing of mobile phone apparatuses, or the like.

SUMMARY OF THE INVENTION

The present invention has been made in view of the above circumstances. Accordingly, there is a need for a technique which allows a user to check where a search term is located in a displayed page, even in an environment where, for example, a mouse is not used or not available.

A program according to an embodiment of the present invention causes an information processing apparatus to execute the steps of assigning an operating element of an operation input device to a search term having been input, displaying an information image containing the search term on a screen, the information image being obtained on the basis of search processing using the search term, and indicating a position of the search term in the information image, the search term being assigned with the operating element in the assigning step, when operation information on the operating element assigned to the search term is input while the display of the displaying step is being performed.

In the displaying step, the search term and an operating element image representing the operating element assigned to the search term in the assigning step are displayed together with the information image.

The operating element image is displayed so as to be adjacent to the search term assigned with the operating element in the assigning step or displayed so as to be partially superimposed on the search term.

The information image displayed in the displaying step is an image of a list of a search result obtained on the basis of the search processing using the search term.

The information image displayed in the displaying step is an information image selected and acquired from the search result list image obtained on the basis of the search processing using the search result.

In the indicating step indicating a position of the search term in the information image, a cursor is displayed at a position where the search term is presented in the information image.

An information processing method according to an embodiment of the present invention includes the steps of assigning an operating element of an operating input unit to a search term having been input, displaying an information image containing the search term on a screen, the information image being obtained on the basis of search processing using the search term, and indicating a position of the search term in the information image, the search term being assigned with the operating element in the assigning step, when operation information on the operating element assigned to the search term is input while the display of the displaying step is being performed.

An information processing apparatus according to an embodiment of the present invention includes an assigning unit configured to assign an operating element of the operation input device to a search term having been input, and, a display processing unit configured to display an information image containing the search term on a screen, the information image being obtained on the basis of search processing using the search term and indicate a position of the search term in the information image, the search term being assigned with the operating element by the assigning unit, when operation information on the operating element assigned to the search term is input.

According to the present invention, an operating element of an operation input device (for example, a key of a remote controller and the housing of an apparatus) is assigned to a search term input by a user. For example, a plurality of search terms are input, different operating elements are assigned to the individual search terms.

Operating element images representing the operating elements assigned to the search terms are displayed so that the user can recognize which operating element corresponds to which search term.

When one of the operating elements is operated, a corresponding one of the search terms which corresponds to the operation is indicated. For example, a cursor is moved to the corresponding one of the search terms.

With this processing, the user can recognize a position of a target search term through a single operation of the operating element assigned to the target search term even in an environment where a mouse is not available.

In addition, when a region including a search term in a page is a link portion (for example, a part in which a URL of another web page is set), the user operates the operating element assigned to the search term as described above so as to select a link. By performing a setting operation after the cursor is moved through the operation on the operating element, the user can accesses a link page. This arrangement realizes high operability.

Note that the term "cursor" herein refers to an indicator used to indicate a specific region or position on a screen, and various manners of indicating positions can be applied. Any operation for indicating a position of a target object on a screen, such as framing, underlining, dotting, shading, and highlighting, is included in the operations of a cursor.

The term "indication" is used herein to denote an operation that allows a user to clearly recognize a position of a search term displayed on a screen by an operation such as framing, underlining, highlighting, transparent coloring, or dotting.

As the operation input device mentioned above, a device such as an operation unit provided on the housing of a remote controller, an electronic apparatus, or a keyboard device can be applied. The operating element mentioned above can be, for example, a press key, a rotary operating element, or a sliding operating element.

In addition, the operating element image mentioned above serves to indicate to a user an operating element assigned to a search term. Any image style (character type, image type, design, etc.) can be applied to the operating element image.

According to the present invention, a user can easily find a search term by operating an operating element (for example, a specific key of a remote controller) assigned to the search term while viewing an image of a search result or a page selected from the search result.

In addition, an operating element image is displayed so as to be associated with a search term. This allows a user to easily know which operating element of an operation input device corresponds to which search term.

Thus, the user can easily find a search term in an image when performing browsing using a remote controller or the like. This significantly increases user operability.

BRIEF DESCRIPTION OF THE DRAWINGS

FIG. 17 illustrates an operation performed on a search result list in the second example of processing according to an embodiment of the present invention; and FIG. 18 illustrates an operation performed on a search result list in the second example of processing according to an embodiment of the present invention.

DESCRIPTION OF THE PREFERRED EMBODIMENTS

In the following, the preferred embodiments of the present invention will be described using an example of a television receiving apparatus having an Internet browser function.

Figure 1:
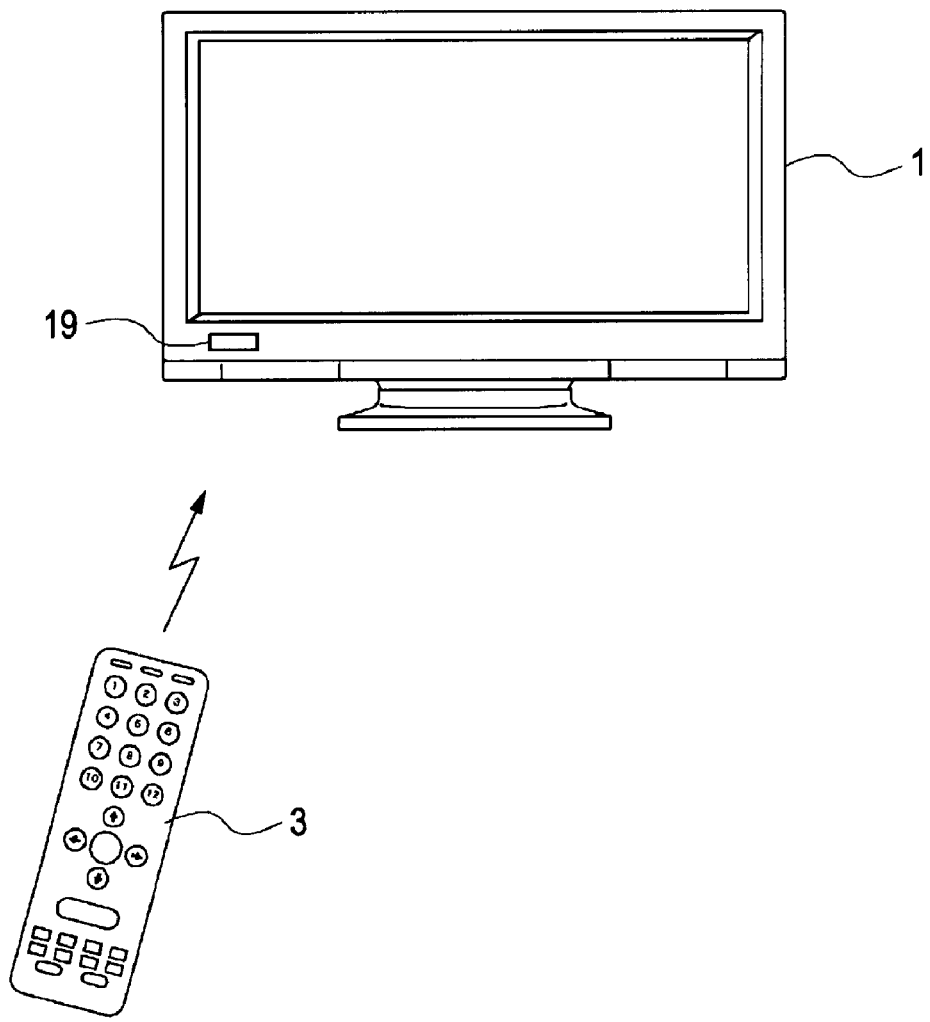
FIG. 1 illustrates a television system according to an embodiment of the present invention.

FIG. 1 illustrates a television receiver 1 according to an embodiment of the present invention. To operate the television receiver 1, a remote controller 3 is used. The remote controller 3 outputs infrared command signals in response to various key operations. The infrared command signals are received by a light receiving unit 19 of the television receiver 1.

The television receiver 1 includes a tuner for terrestrial broadcasting and satellite broadcasting, for example, and receives and demodulates a stream video signal of a broadcast program. Then the video signal is supplied to a display device for display, which has screen such as a CRT (cathode-ray tube) panel, a liquid crystal display panel, and plasma display panel. The television receiver 1 also has a communication function for a network such as the Internet and a browser function and is capable of displaying data of a web site or the like on the screen.

Note that in the television receiver 1 illustrated in FIG. 1 may be a television system having a tuner apparatus and a monitor apparatus which are physically separate from each other.

Figure 2:
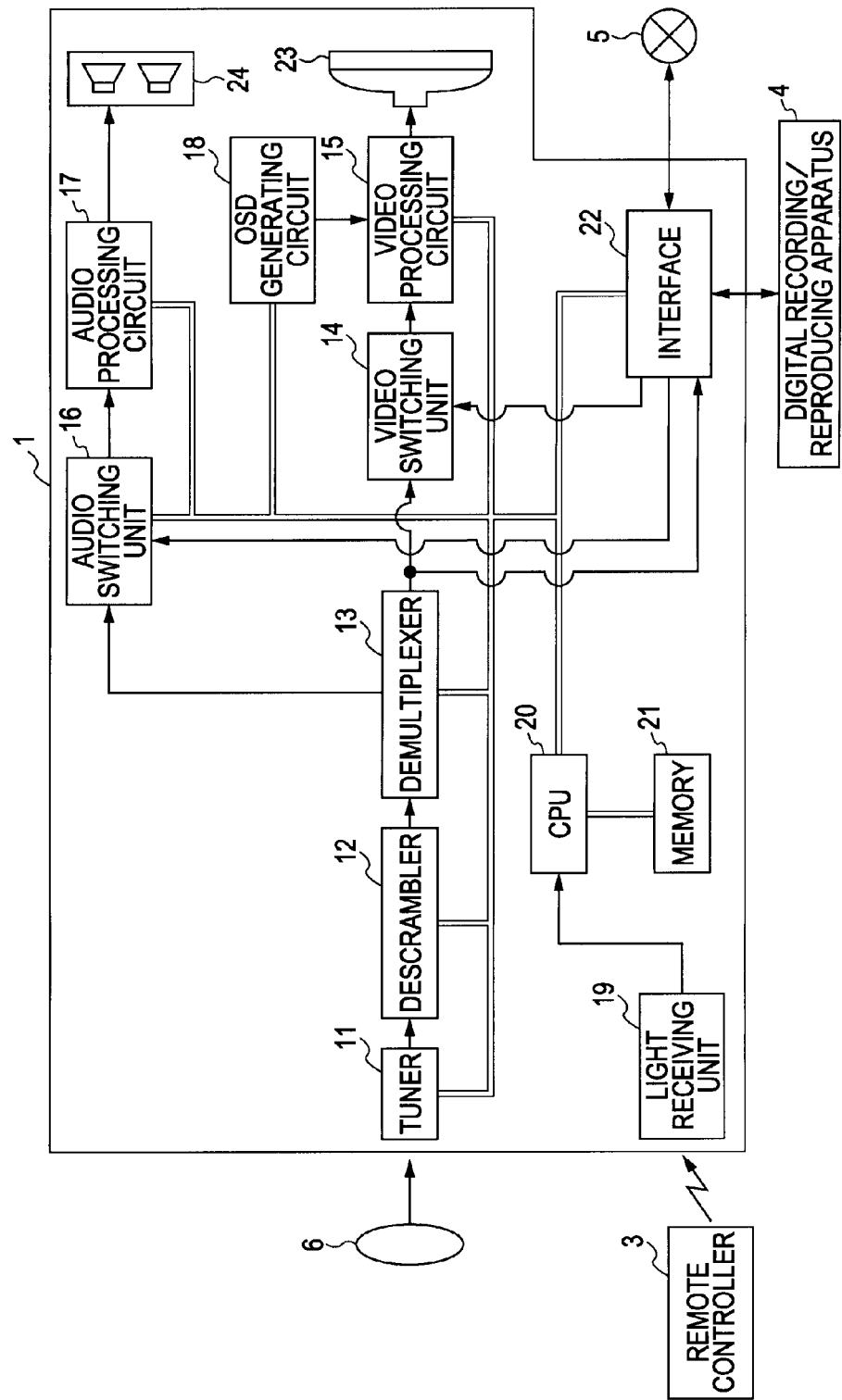
FIG. 2 is a block diagram illustrating a television receiver according to an embodiment of the present invention.

Referring to FIG. 2, a detailed configuration of the television receiver 1 is illustrated.

The television receiver 1 includes a tuner 11 which functions as a broadcasting receiver for terrestrial broadcasting or satellite broadcasting. The tuner 11 receives and demodulates digital broadcasting waves, for example, received through an antenna 6.

The receiving function may not necessarily be implemented in the above manner, in which a broadcast signal received through the antenna 6 is demodulated. For example, a tuner or a decoder for so-called cable television broadcasting and streaming broadcasting supplied via a network such as the Internet can also be used.

The broadcast signal received by the tuner 11 is decoded by a descrambler 12 for descrambling. The descrambled signal is supplied to a demultiplexer 13.

The demultiplexer 13 separates each signal such as an encoded video signal and audio signal from a transport stream of received multiplexed digital broadcast signals.

The video signal separated by the demultiplexer 13 is supplied to a video signal processing circuit 15 through a video switching unit 14. The video signal undergoes encoded data decoding and is concerted by video processing circuit 15 into a video signal so as to comply with a predetermined standard such as the NTSC (National Television System Committee) standard. The converted video signal undergoes processing such as video decoding processing, Y-signal processing, and chrominance signal processing. The processed signal is then supplied to a display unit 23. The video signal standard is not limited to the NTSC standard, and other standards such as PAL (phase alternation by line) and SECAM (sequential color and memory) may also be employed.

The audio signal separated by the demultiplexer 13 is supplied to an audio processing circuit 17 through an audio switching unit 16. The audio processing circuit 17 performs processing such as encoded data decoding and analogue-to-digital (A/D) conversion on the audio signal and supplies the processed signal to a speaker unit 24.

The display unit 23 outputs the video signal received from the video processing circuit 15 as an image. The speaker unit 24 outputs the audio signal received from the audio processing circuit 17 as sound.

The television receiver 1 also has an OSD (on-screen display) generating circuit 18 for generating image data for display on the basis of control performed by a CPU (central processing unit) 20. When the OSD generating circuit 18 generates image data such as various types of characters, icons, cursors, and menu images, the video processing circuit 15 superimposes the image data on a video signal or converts the image data into a video signal. The processed video signal is then supplied to the display unit 23 so that an image corresponding to the image data is displayed.

The image data generated by the OSD generating circuit 18 includes, for example, a GUI (graphical user interface) image such as a menu and an icon used for various operations, a message, a channel indication, a volume indication, and an image based on a browser function.

The television receiver 1 also includes an interface 22 for communicating with a network 5 such as the Internet and external apparatuses. The interface 22 may be, for example, an interface that complies with a communication standard such as the IEEE (Institute of Electrical and Electronic Engineers) 1934 and USB (Universal Serial Bus). Thus, the interface 22 can also constitute Ethernet (registered trademark) or a LAN (local area network).

There are no limitations on the interface scheme, communication scheme, and network structure for the interface 22. Thus, the interface 22 in FIG. 2 is illustrated to collectively represent a component for implementing an Internet communication function and a function of communicating with an external apparatus such as a digital recording/reproducing apparatus 4.

Video data and audio data that are supplied from a network 5 or an external apparatus such as the digital recording/reproducing apparatus 4 are supplied to the video processing circuit 15 through the video switching unit 14 and to the audio processing circuit 17 through the audio switching unit 16, respectively, and undergo predetermined processing. Thus, the broadcast video signal and broadcast audio signal received by the tuner 11 can be output from the display unit 23 and the speaker unit 24 as an image and sound, respectively.

The digital recording/reproducing apparatus 4 can be a digital video recorder and a hard disk recorder, for example. It is also possible that a plurality of digital recording/reproducing apparatuses 4 are connected.

The CPU 20 functions as a controller that controls the entire television receiver 1. Specifically, in response to a user operation or an operating program, the CPU 20 controls processing such as tuning of the tuner 11, processing of the descrambler 12 and the demultiplexer 13, switching operations of the video switching unit 14 and the audio switching unit 16, processing of the video processing circuit 15 and the audio processing circuit 17, and generation of an OSD image of the OSD generating circuit 18.

The CPU 20 also functions as a browser for data on Internet sites or the like. Specifically, the CPU 20 accesses a web site or the like through the interface 22 and executes display processing on an image obtained through the web site or link processing.

The television receiver 1 also includes a memory 21. In FIG. 2, the memory 21 collectively represents memory areas such as a RAM (random access memory), a ROM (read-only memory) and a flash memory that are accessed by the CPU 20.

The ROM in the memory 21 stores platform software modules, activation modules, etc., which operate the CPU 20.

The RAM in the memory 21 temporarily stores the activation modules stored in the ROM, a platform software program such as an OS (operating system), an application program, or parameters that vary as necessary for executing these modules and programs. The RAM is also used as a work area for various types of calculation.

The flash memory in the memory 21 is used to store information (for example, various processing coefficients and history information) that should not be lost even in a power-off state.

Figure 3:
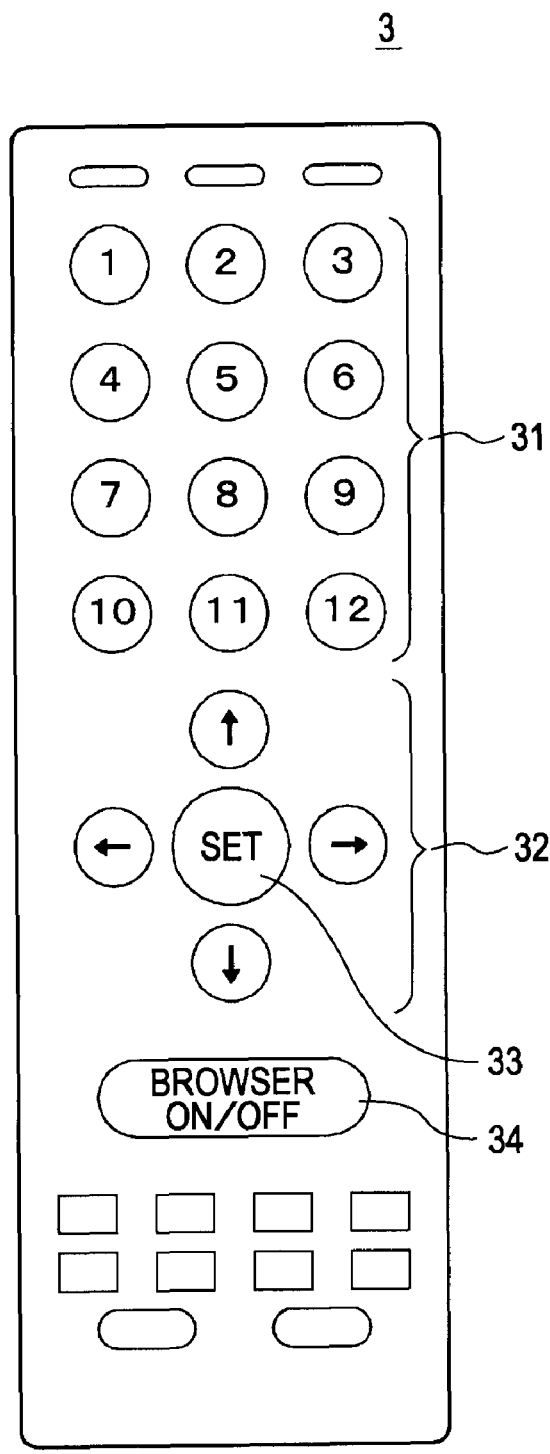
FIG. 3 illustrates operating elements of a remote controller according to an embodiment of the present invention.

FIG. 3 illustrates the remote controller 3 which serves as an operation input device.

The remote controller 3 is provided with various operation keys as operating elements which are used for operating the television receiver 1 and other external apparatuses connected to the remote controller 3. For example, the remote controller 3 has number keys 31, arrow keys 32, a SET key 33, and a browser key 34.

The number keys 31 include "1" to "12" keys which function as station selection keys in a normal television broadcast receiving mode.

The arrow keys 32 include an UP key, a DOWN key, a RIGHT key, and a LEFT key each used for an operation for moving a cursor toward a corresponding direction or moving over portions to be selected on a menu screen. When a browser is in operation, the arrow keys 32 allow a cursor to be sequentially moved to each link portion.

The SET key 33 is used for a setting operation for executing the function/processing corresponding to a portion selected by the cursor.

The browser key 34 serves to provide an instruction of turning on or turning off a browser function.

When a user operates the remote controller 3, an operation signal is output, for example, as an infrared signal. The infrared operation signal is received by the light receiving unit 19. The received infrared signal is converted into an electric signal and sent to the CPU 20. Thus, the user operates the operating elements of the remote controller 3 so as to send various instructions and entries. The CPU 20 detects operation input information from the remote controller 3 and executes predetermined control to cause the television receiver 1 to perform an operation instructed by the user. Note that the signal transmission scheme for the remote controller 3 is not limited to the infrared signal transmission. For example, signal transmission using radio signals can also be applied to the remote controller 3.

In addition, operations similar to the operations of the remote controller 3 described above can also be realized using operating elements such as operation keys and an operation dial which operate as a panel operation unit (not shown) provided on the housing of the television receiver 1.

Operations of the user using the remote controller 3 or the panel operation unit includes, for example, station selection, volume adjustment, mode switching, a cursor operation, a setting operation, and a browsing operation.

Operations of the television receiver 1 having the configuration described above will now be described.

A user activates an application such as a browser application by operating the remote controller 3. When a user performs an operation for instructing ON and OFF of a browser using the remote controller 3, the CPU 20 reads the browser application from the memory 21 and activates the application. When the browser is activated, the CPU 20 obtains information on the Internet via the interface 22 and displays the information for the user using the browser function.

Figure 4:
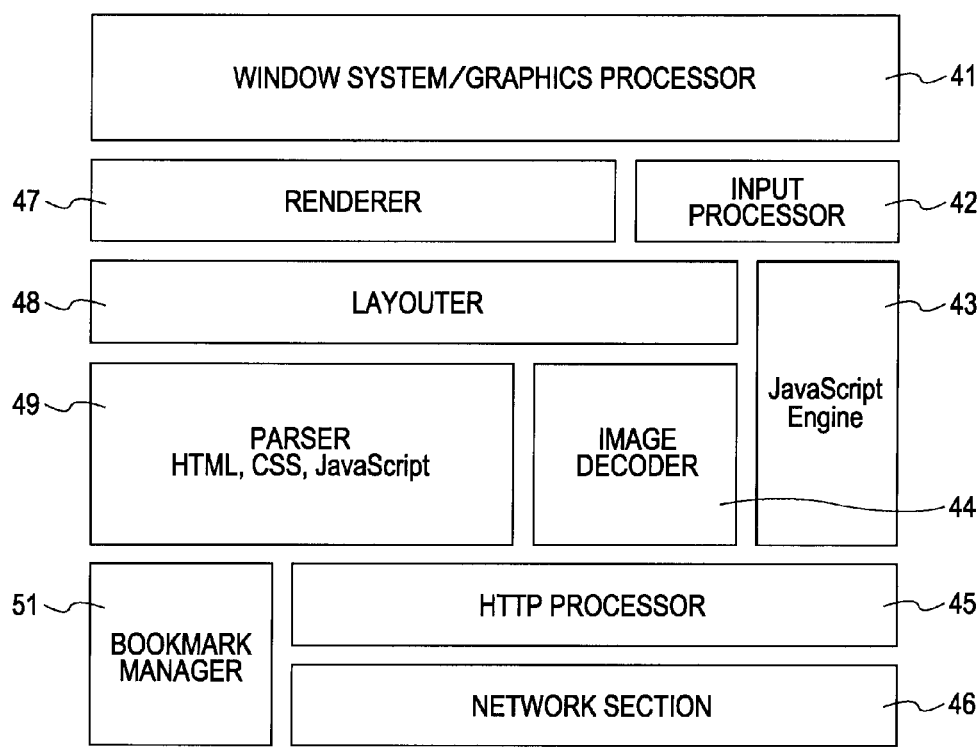
FIG. 4 illustrates a software configuration of a browser function according to an embodiment of the present invention.

FIG. 4 illustrates a software configuration for implementing the browser function by the CPU 20.

As illustrated in the figure, the software includes a Window system/graphics processor 41, an input processor 42, a JavaScript engine 43, an image decoder 44, an HTTP (hypertext transport protocol) processor 45, a network section 46, a renderer 47, a layouter 48, a parser 49, and a bookmark manager 51.

When the television receiver 1 is connected to the network section 5 through the interface 22, the HTTP processor 45 performs protocol processing on data acquired by the network section 46, and the parser 49 analyzes the data. On the basis of the result of the analysis, the layouter 48 determines a layout of a link or the like, and the renderer 47 controls display using the Window system/graphics processor 41.

An operation by a user is processed through the input processor 42. In this example, processing related to, for example, an input operation performed on a display screen by the browser function is executed by the input processor 42 in cooperation with the renderer 47 and the layouter 48. In addition, a user operation of saving/selecting a bookmark is managed and processed by the bookmark manager 51.

In the following, an example of processing according to an embodiment of the present invention will be described. As a first example, processing performed when, for example, a web page image is displayed on the display unit 23 through a browser function will be described.

Figure 5:
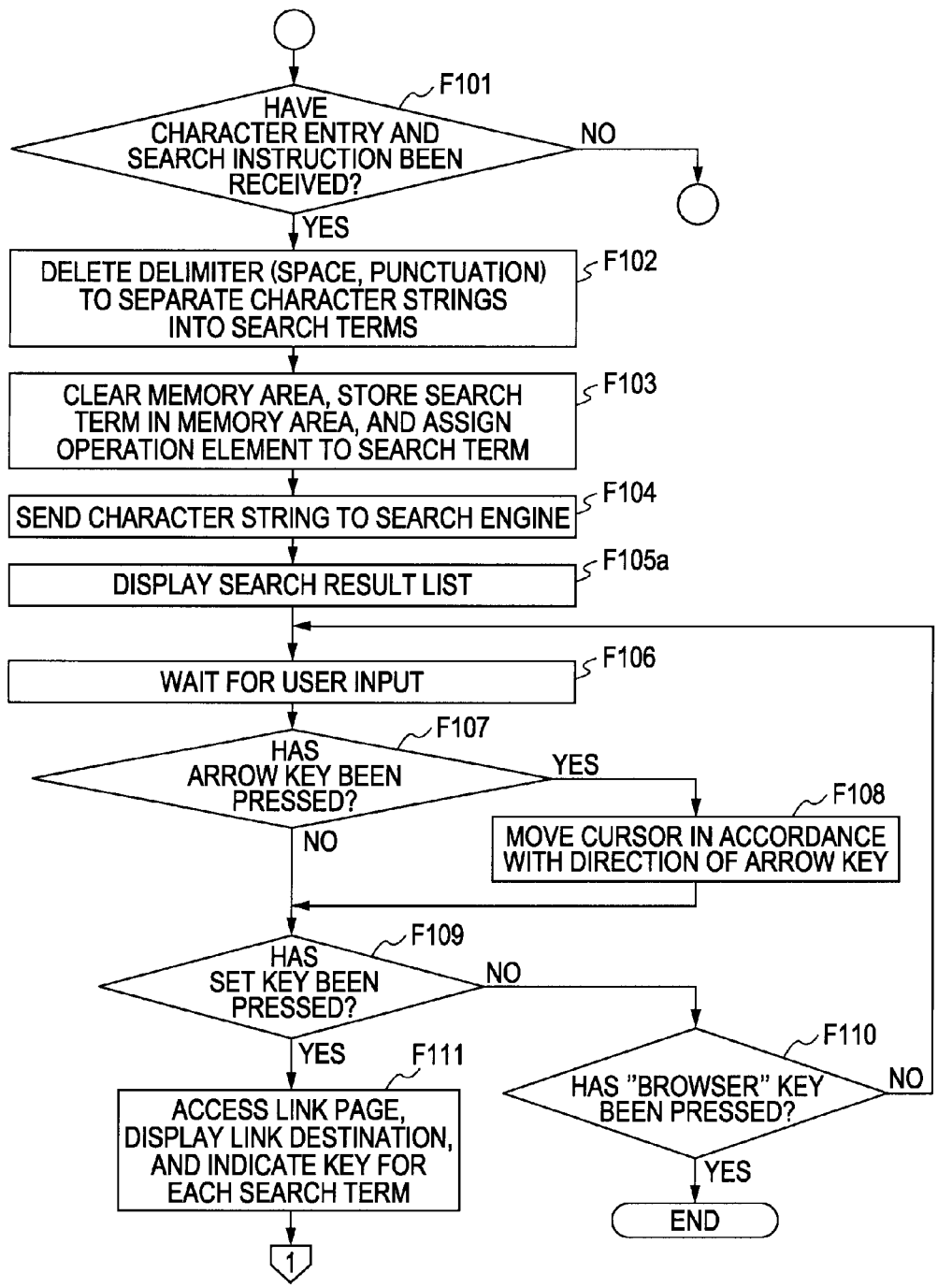
FIG. 5 is a flowchart illustrating a first example of processing according to an embodiment of the present invention.

FIG. 5 illustrates a processing procedure performed by the CPU 20 when a browser is executed in response to an instruction of the execution of the browser function sent by a user using the remote controller 3.

Figure 8:
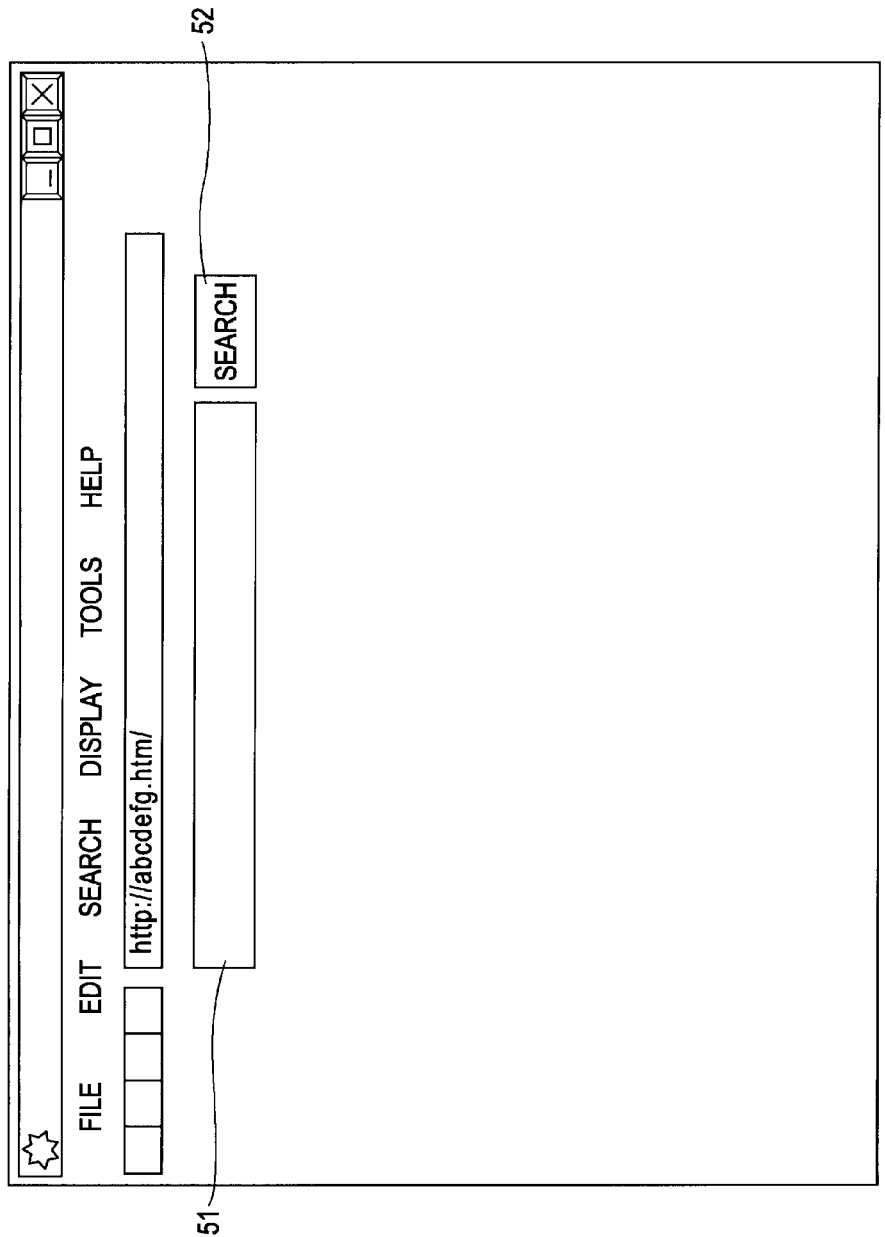
FIG. 8 illustrates a search screen according to an embodiment of the present invention.

An example of a screen of the search engine displayed by the browser function, which is used by the user to conduct a search, is illustrated in FIG. 8.

FIG. 8 illustrates a search screen from which information on an Internet website is obtained. The search screen contains a search term field 51 in which a character string such as a word (search term) that a user desires to search for. The search screen also contains a search button 52 to be pressed to execute a search after the user enters a search term in the search term field 51.

The processing procedure illustrated in FIG. 5 is executed by the CPU 20 after such a search screen is displayed.

At STEP F101, the CPU 20 waits for input by the user in the search term field 51 and an instruction of search execution. Specifically, the CPU 20 proceeds from STEP F101 to STEP F102 when an instruction of search execution is sent by a user by entering a search term and then clicking the search button 52.

The user clicks the search button 52 using the arrow keys 32 and the SET key 33. In response to an operation of one of the arrow keys 32, the CPU 20 positions a cursor at the search button 52 on the screen. When an operation of the SET key 33 is detected, the CPU 20 recognizes the operation on the SET key 33 as clicking of the search button 52.

In the following, a case is assumed where the user enters characters "remote browser searching" in the search term field 51 and then clicks the search button 52.

At STEP F102, the CPU 20 delimits the character strings entered in the search term field 51 and deletes characters such as a space and a punctuation mark so as to separate the character strings into search terms.

In this case, a space is used as a delimiter and the entered character strings are separated into three search terms, namely, "remote", "browser", and "searching".

At STEP F103, the CPU 20 clears a search term storing memory area 21a allocated within the memory 21 for storing a search term and stores the above search terms in the search term storing memory area 21a. Then, the CPU 20 executes processing for assigning the operating elements of the remote controller 3 to the search terms. For example, each of the number keys 31 is assigned to an individual search term. In this processing, every time the user enters a search term in the search term field 51, the search term is assigned with a specific one of the operating elements.

Figure 7:
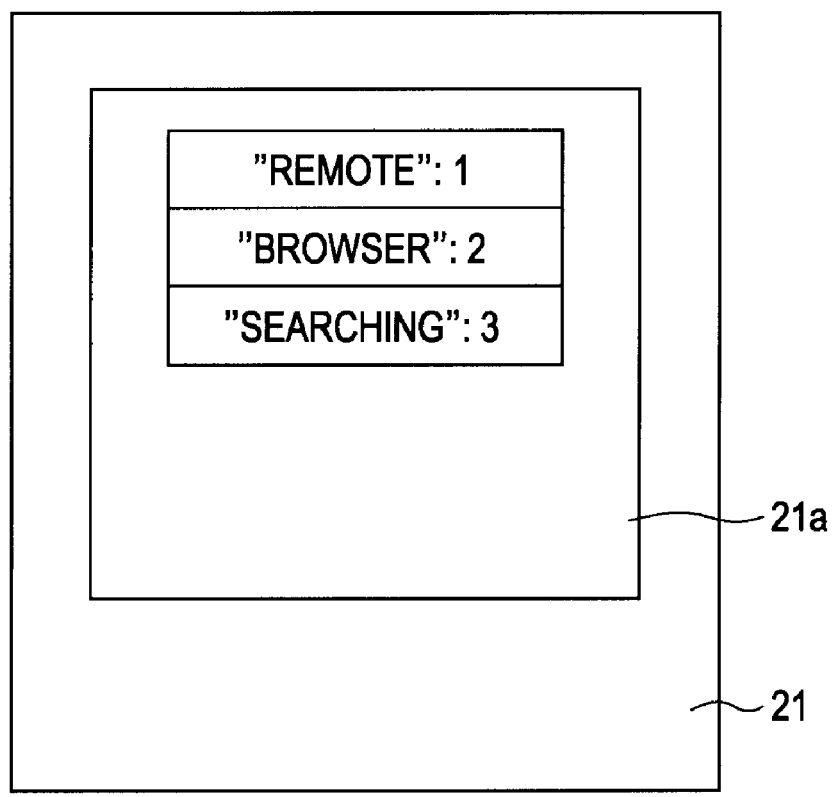
FIG. 7 illustrates a memory for storing a search term according to an embodiment of the present invention.

Referring to FIG. 7, the search term storing memory area 21a allocated within the memory 21 is illustrated. In this search term storing memory area 21a, a search term and an operating element which is assigned to the search term are stored so as to be associated with each other. For example, the three search terms "remote", "browser", and "searching", are associated with the "1" key, the "2" key, and the "3" key of the number keys 31 of the remote controller 3, respectively, in the search term storing memory area 21a.

In a case where the CPU 20 sequentially assigns the number keys 31 of the remote controller 3 to the search terms, for example, the CPU 20 assigns the "1" key to the search term "remote", the "2" key to the search term "browser", and the "3" key to the search term "searching". Then, the CPU 20 stores information representing the result of this assignment in the search term storing memory area 21a, as illustrated in FIG. 7.

When only one search term is entered, the "1" key, for example, of the number keys 31 is assigned. In addition, when four search terms are entered, the "1" key to the "4" key of the number keys 31 are assigned. Note that the number keys 31 are not limited to being assigned to search terms in sequence. In addition, operating elements to be assigned to the search terms are not limited to the number keys 31. For example, when other types of keys such as character keys and alphabet keys are provided on the remote controller 3, such keys can also be assigned to the search terms.

At STEP F104, the CPU 20 sends one or a plurality of character strings to an external search engine via the interface 22. A search server, which functions as the search engine, performs webpage searching on the basis of the search terms and returns information representing a result of the searching to the CPU 20. Upon receiving the information representing the search result from the search engine, the CPU 20 displays the search result information on the display unit 23, at STEP F105*a*. Specifically, the CPU 20 displays on the display unit 23 a list of web pages or the like that contain the words that the user desires to search for.

Figure 9:
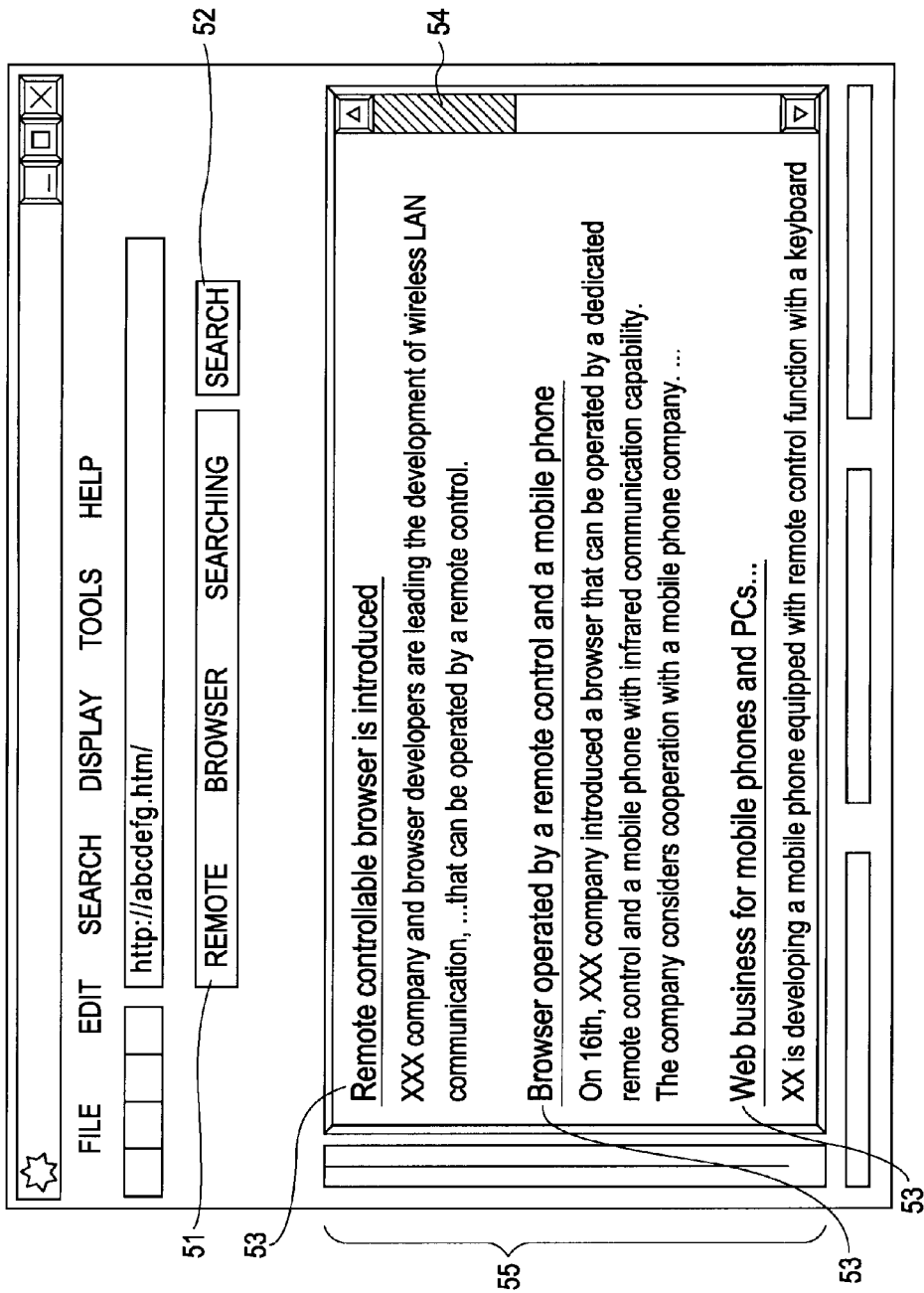
FIG. 9 illustrates an example of display of a search result list according to an embodiment of the present invention.

An example of a screen on which such search result information is displayed is illustrated in FIG. 9. As illustrated in the figure, the search result information is displayed in the form of a list in a display field 55. The user views the display of the search result information so as to select a webpage that he or she desires to view.

In FIG. 9, regions indicated by underlines, for example, represent link portions 53 in which links are set. These link portions 53 are regions in each of which a link to information containing any of entered search terms (e.g., the URL (uniform resource locator) of a webpage) is set. In this example, information on link destinations each contains at least one of or all of the three search terms "remote", "browser", and "searching", which have been entered by the user. For example, the link destination corresponding to one of the link portions 53 which is shown on the top of the display field 55 includes content related to any one of or all of the search terms "remote", "browser", and "searching".

A scrollbar 54 shown in FIG. 9 is used for scrolling through the entire content to be displayed in the display field 55.

In many cases, not all data obtained by accessing a network can be displayed on the screen, but a part of the data is displayed due to the data size or the screen size. In such a case, the scrollbar 54 is displayed to allow the user to scroll through the screen.

At STEP F106, the CPU 20 waits for operation input by the user while displaying, for example, the image on the screen illustrated in FIG. 9. At this time, the CPU 20 monitors operations of the arrow keys 32, the SET key 33, and the browser key 34, which are performed by the user using the remote controller 3.

Figure 10:
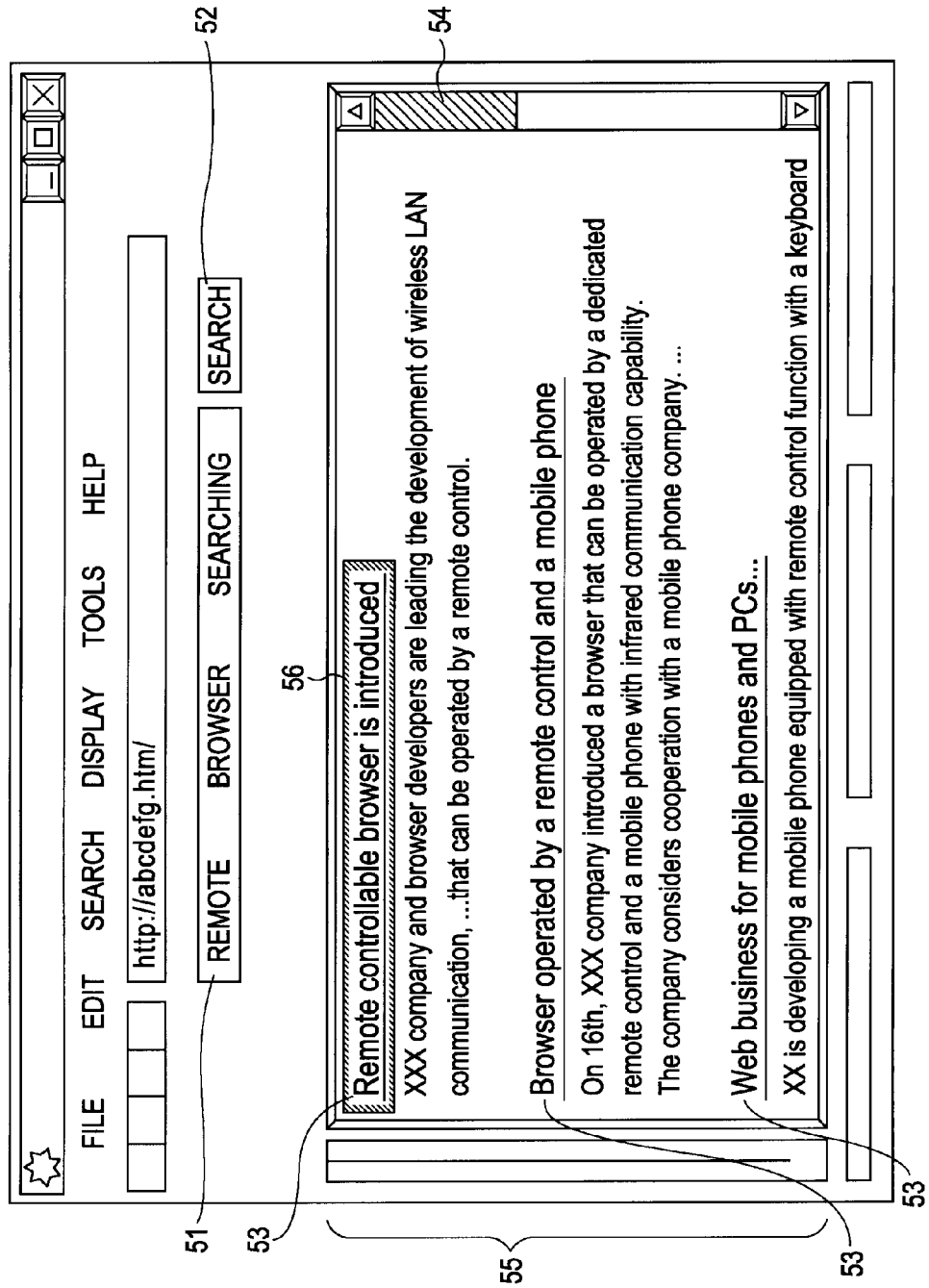
FIG. 10 illustrates an operation performed on a screen of a search result list according to an embodiment of the present invention.

If an operation of one of the arrow keys 32 of the remote controller 3 is detected at STEP F107, the CPU 20 proceeds to STEP F108. At STEP F108, the CPU 20 moves the cursor on the screen in accordance with the direction designated by the one of the arrow keys 32. For example, if the DOWN key of the arrow keys 32 is pressed while the image of FIG. 9 is being displayed, the CPU 20 moves a cursor 56 to one of the link portions 53 which appears on the top of the display field 55, as illustrated in FIG. 10. If any of the arrow keys 32 is further pressed, the CPU 20 moves the cursor 56 to another one of the link portions 53 in accordance with the direction corresponding to the pressed one of the arrow keys 32. This processing permits the user to select any item shown in the search result list (i.e., any of the link portions 53 which is linked to a website) by operating the arrow keys 32.

The cursor 56 mentioned above has a function of indicating the position of an item displayed in the display field 55 by, for example, framing, underlining, highlighting, transparent coloring, dotting, and shading the item. FIG. 10 illustrates a case as an example in which one of the link portions 53 is selected by a shaded cursor.

At STEP F110, if an operation of the browser key 34 of the remote controller 3 is detected, the CPU 20 terminates the browser processing.

On the other hand, at STEP F109, if an operation of the SET key 33 of the remote controller 3 is detected, the CPU proceeds to STEP F111.

The SET key 33 is effective when the cursor 56 is placed at a predetermined position, such as one of the link portions 53, an entry field such as the search term field 51, and the search button 52. When the cursor 56 is not placed at such an effective position, an operation of the SET key 33 is regarded as invalid. When the SET key 33 is operated while the cursor 56 is placed at the search term field 51, the CPU activates the search term field 51 to enable entry of characters. In the following, the description of the processing procedure is continued assuming that the SET key 33 is operated while the cursor 56 is placed at the top one of the link portions 53.

Figure 11:
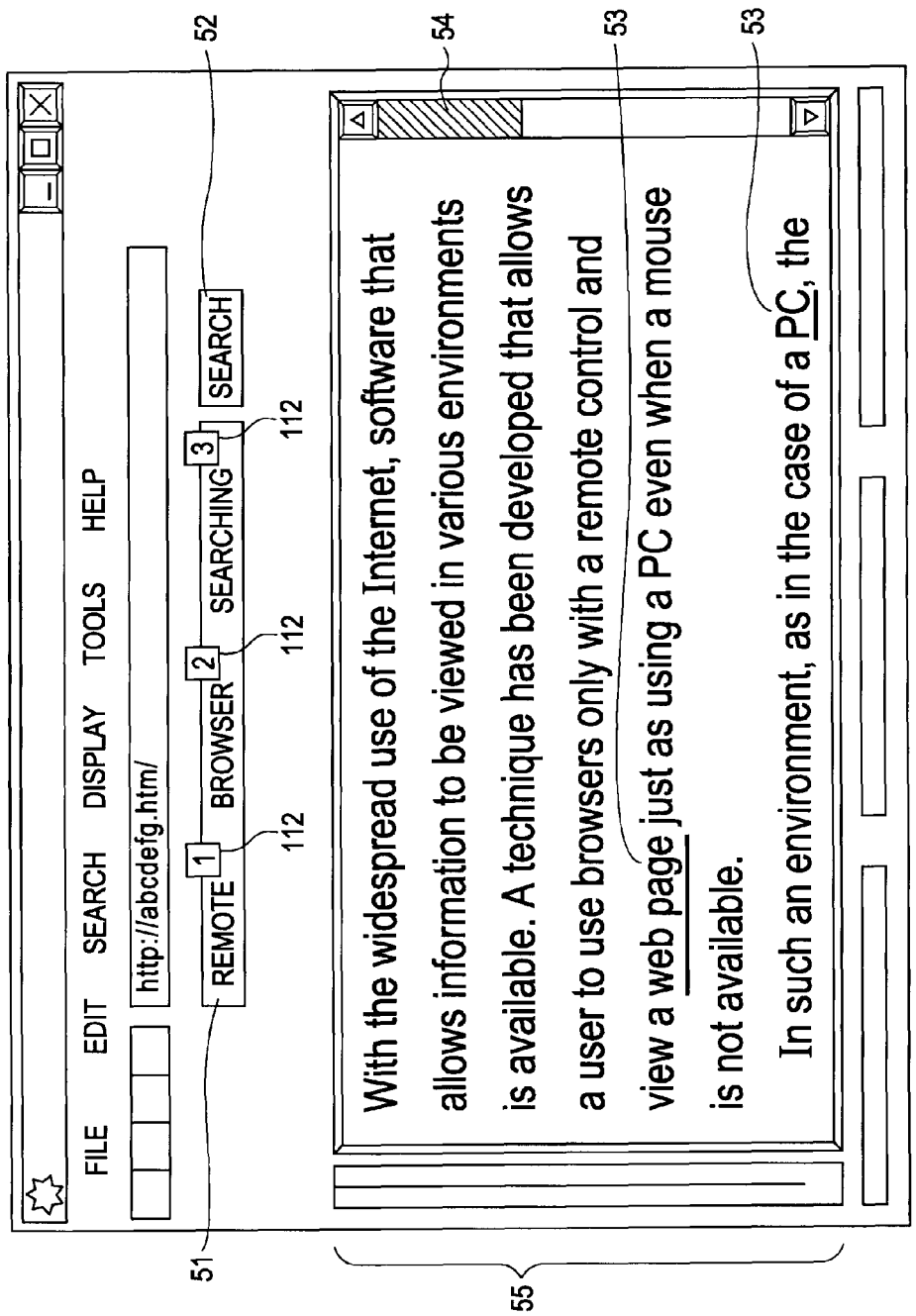
FIG. 11 illustrates a screen of a link page according to an embodiment of the present invention.

When the top one of the link portions 53 at which the cursor 56 is placed is selected and set by the user, the CPU 20 accesses a corresponding link page and displays an image of the link page at STEP F111. Specifically, the CPU 20 accesses a network using a URL or the like as the link destination of the top one of the link portions 53 specified by the cursor 56 and loads an image of a page corresponding to the specified link portion to display the image on the display unit 23. FIG. 11 illustrates an example of the image of a link page displayed on the display field 55 as the result of the above processing.

In this example, terms "web page" and "PC" indicated by underlines on the screen of the display field 55 are set as the link portions 53.

Further, when the image of the link page is displayed in the processing of STEP F111, the CPU 20 indicates the entered search terms and corresponding operating element images in the search term field 51.

Specifically, the CPU 51 displays in the search term field 51 the search terms "remote", "browser", and "searching", which have been entered in the processing of STEP F101, and also displays operating element images 112 "1", "2", and "3", so as to be associated with the above search terms, respectively.

These operating element images 112 serve to present to the user the operating elements on the remote controller 3 which are assigned to the search terms. In this example, the operating element images 112 indicate that the "1" key of the number keys 31 is assigned to the search term "remote", the "2" key of the number keys 31 is assigned to the search term "browser", and the "3" key of the number key 31 is assigned to the search term "searching".

Figure 13:
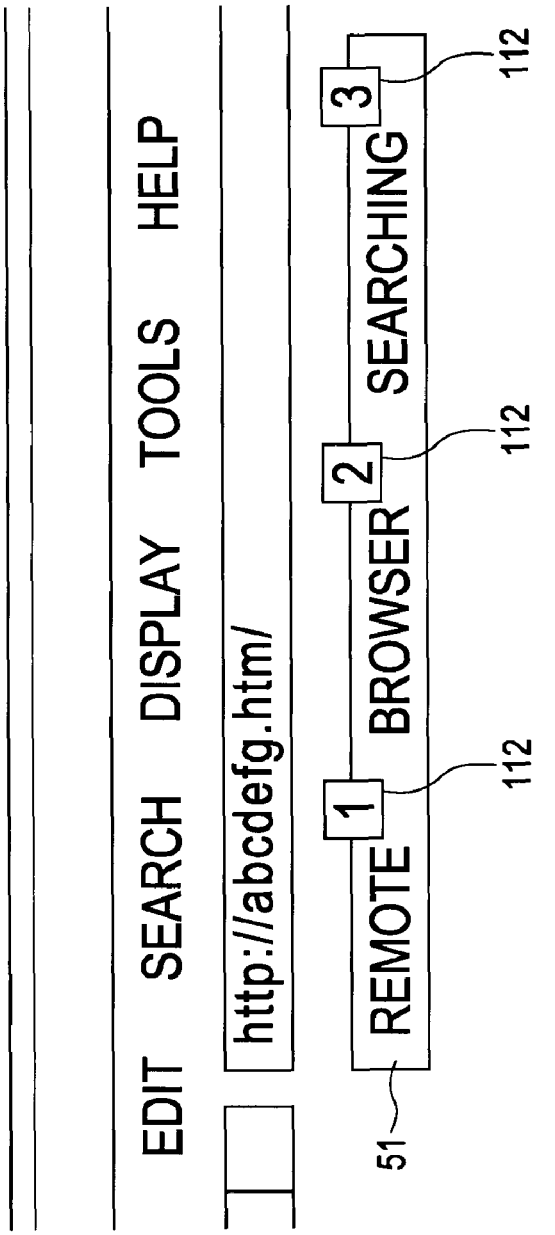
FIG. 13 illustrates an example of a display scheme of operating element images according to an embodiment of the present invention.

FIG. 13 is an enlarged view of the search term field 51 and its vicinity. This figure illustrates the search terms and the corresponding operating element images 112 displayed in the search term field 51 in an enlarged manner. In this example, each of the operating element images 112 can be displayed as a translucent portion enclosed by a frame and arranged so as to be adjacent to or partially superimposed on a corresponding one of the search terms.

With this arrangement, in which the operating element images 112 are displayed to be adjacent to or superimposed on the corresponding search terms, the user easily recognize the operating elements that are assigned to the search terms.

Note that these operating element images 112 are not necessarily presented to be adjacent to or superimposed on the search terms, and can be presented in any manner as long as the correspondence relationship between the search terms entered in the search term field 51 and the number keys 31, for example, can be clearly recognized by the user.

Figure 6:
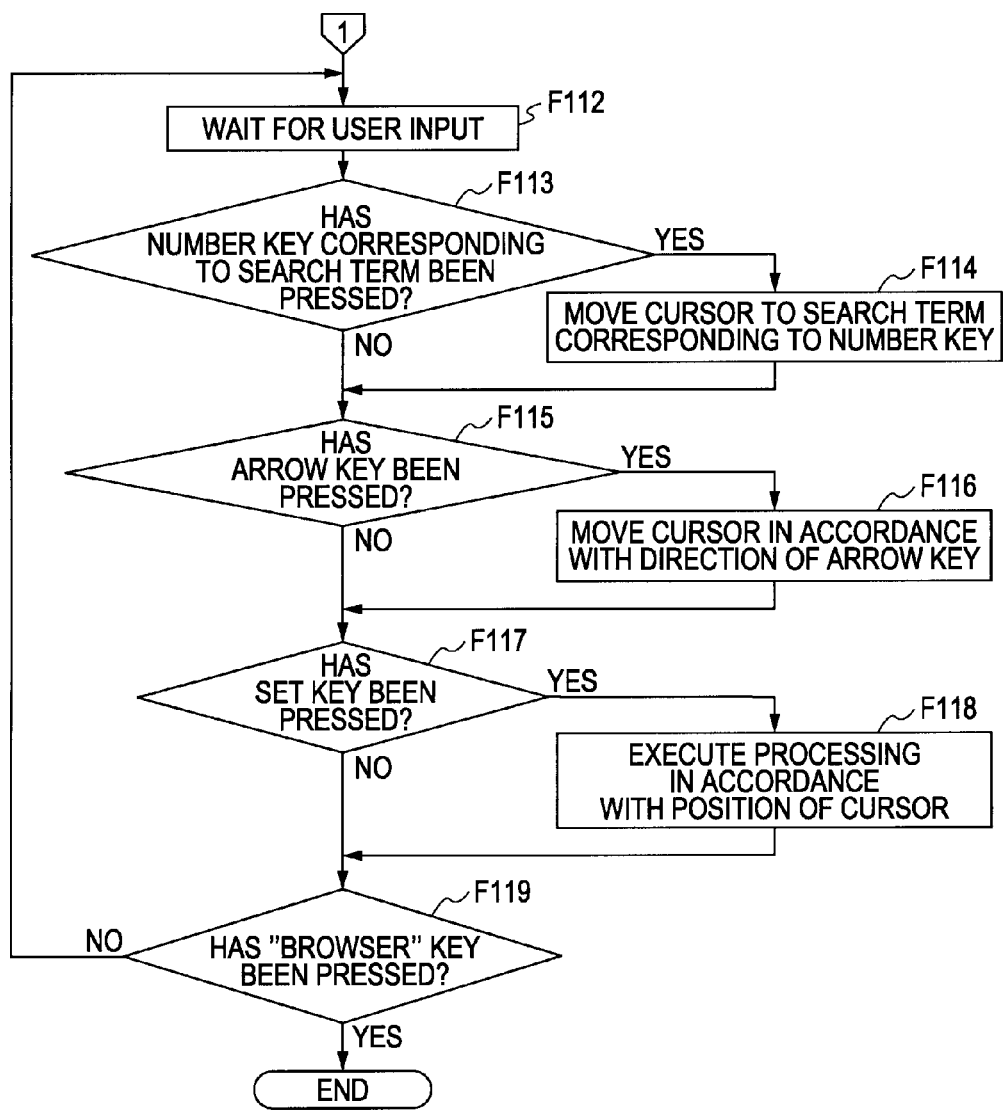
FIG. 6 is a flowchart illustrating the first and second examples of processing according to an embodiment of the present invention.

The user performs various operations while viewing the information content on the image of the link page illustrated in FIG. 11, which is displayed in the processing of STEP F111. For example, the user performs operations such as skipping a page, moving a cursor to a link portion, and looking for a target search term within the link page. At this time, the CPU 20 waits for an operation input by the user at STEP F112 in FIG. 6 while displaying the link page image of FIG. 11. Specifically, the CPU 20 monitors an operation of the number keys 31, the arrow keys 32, the SET key 33, or the browser key 34, which is performed by the user using the remote controller 3.

If an operation of one of the number keys 31 that have been assigned to the search terms in the processing of STEP F103 (i.e., the "1" key, the "2" key, or the "3" key) is detected at STEP F113, the CPU 20 proceeds to STEP F114. At STEP F114, the CPU 20 moves the cursor 56 on the screen in accordance with the search terms corresponding to the number keys 31.

For example, if the "1" key of the number keys 31 is operated while the image of FIG. 11 is being displayed, the CPU 20 moves the cursor 56 to the search term "remote" contained in a text displayed in the displayed field 55, so as to indicate to the user a position of the search term "remote" in the page. If the search term "remote" is also located at another positioning the same page, the CPU 20 further moves the cursor 56 to the other position of the search term "remote" when it detects that the user operates the "1" key of the number keys 31 again. That is, the CPU 20 moves the cursor 56 to each position where the search term "remote" is located, every time an operation of the "1" key of the number keys 31 is detected.

Likewise, the CPU 20 moves the cursor 56 in response to a user operation on another one of the number keys 31 that are assigned to the search terms to a position of a corresponding search term is located. For example, when the "2" key of the number keys 31 is operated, the CPU 20 moves the cursor 56 to each position where the search term "browser" is located in the link page image displayed in the display field 55. In addition, when the "3" key of the number keys 31 is pressed, the CPU 20 moves the cursor 56 to each position where the search term "searching" is located in the link page image. Thus, the CPU 20 indicates to the user the positions of the search terms.

Figure 14:
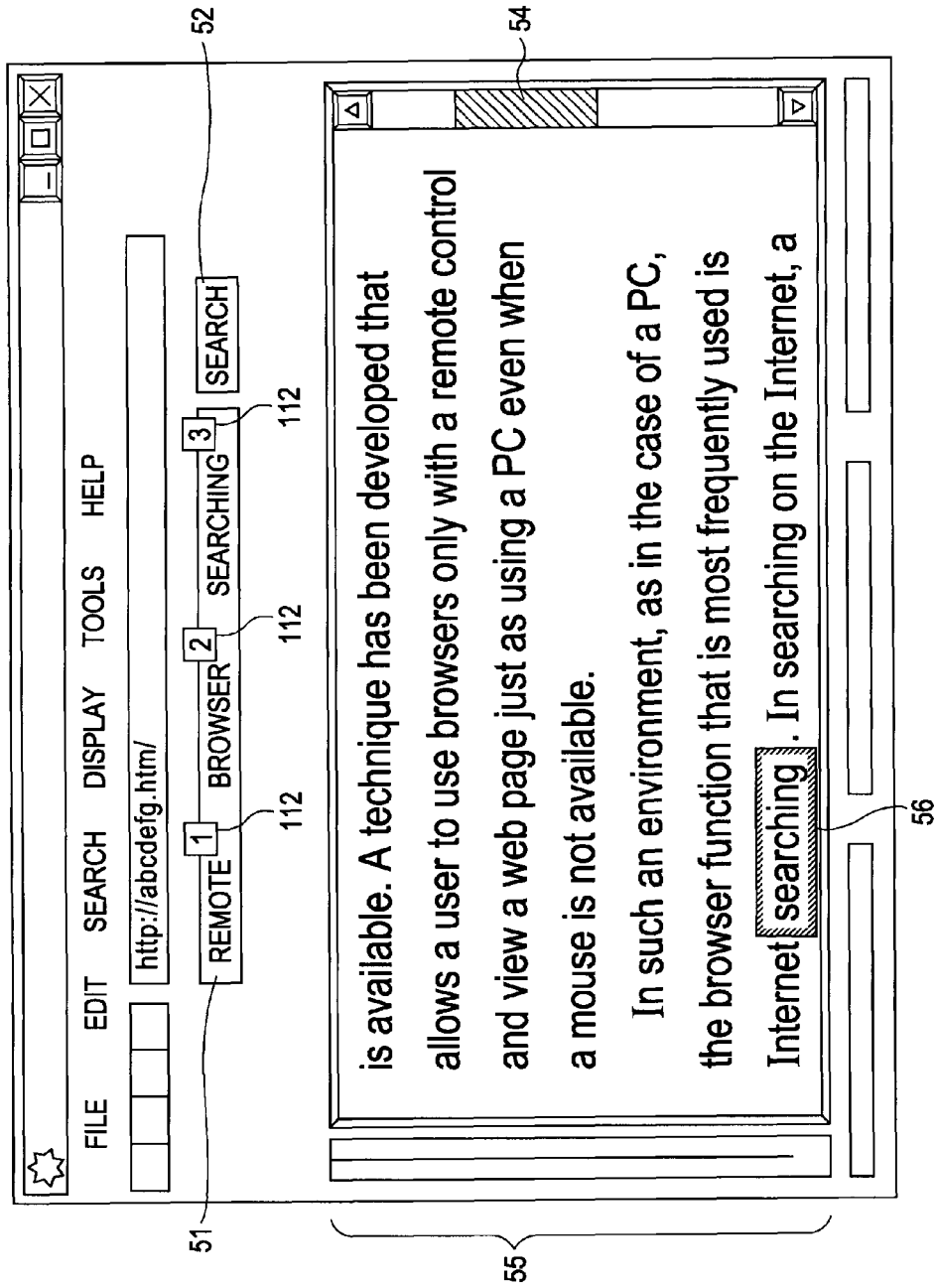
FIG. 14 illustrates an example of an operation performed on a link page screen according to an embodiment of the present invention.

Now, the case where the "3" key of the number keys 31 is operated will be described using FIG. 14. When the amount of text displayed in the display field 55 is large, it may be possible that search terms (i.e., "searching" in this case) are located at positions distant from each other or that no search term appears in an initial image of a link page being displayed, for example. Under such a circumstance, in most cases, the user has to operate the scrollbar 54 to look for a target search term. However, according to this embodiment, the CPU 20 moves the cursor 56 to a position of the target search term in response to an operation of the number keys 31 of the remote controller 3.

Figure 12:
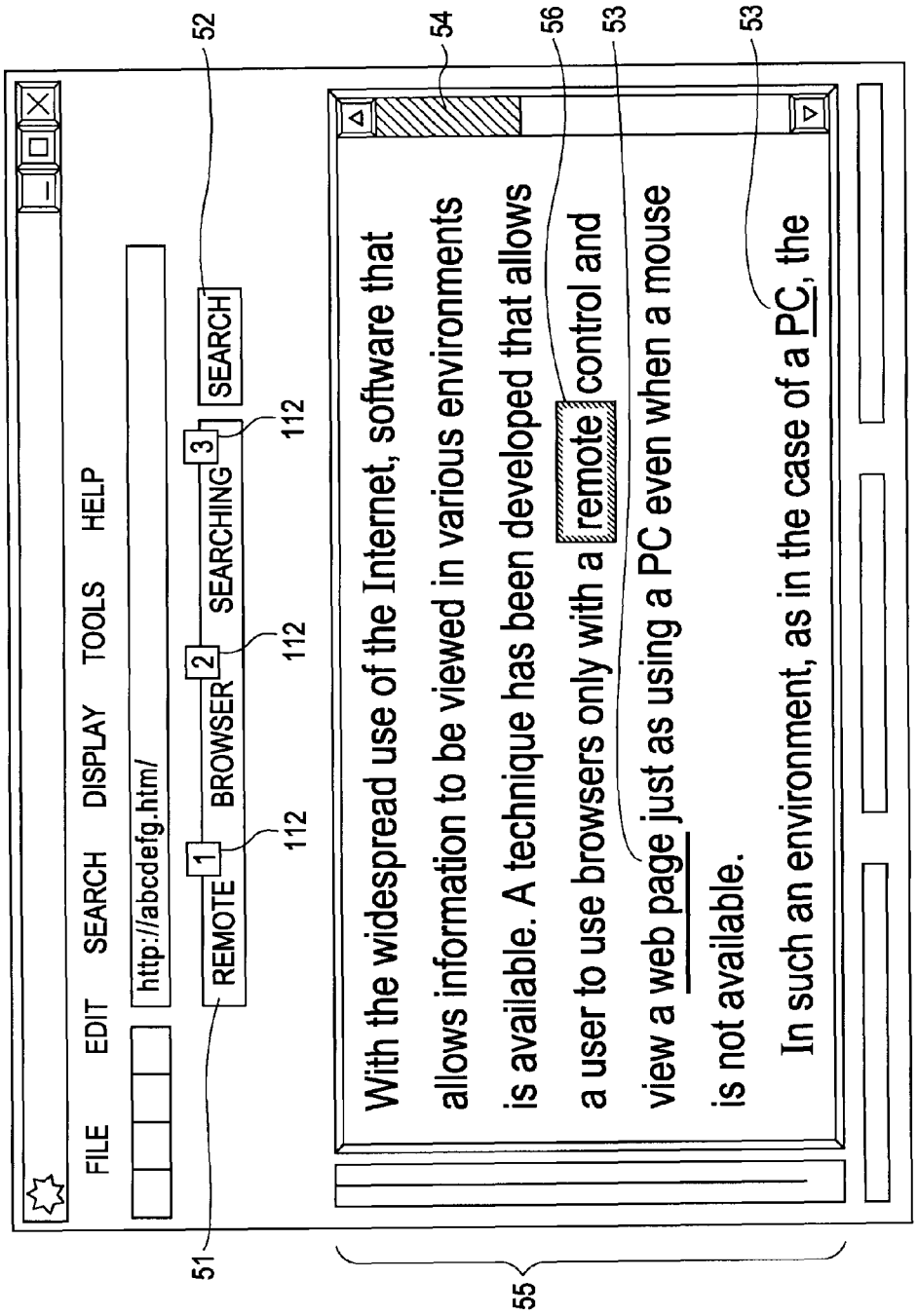
FIG. 12 illustrates an example of an operation performed on a link page screen according to an embodiment of the present invention.

This is explained in detail below. It is assumed that the "3" key of the number keys 31 is operated while the image of FIG. 12 is displayed, and that the search term "searching" is in a subsequent part of the text of the link page which is not currently shown in the display field 55. In this case, as illustrated in FIG. 14, the CPU 20 scrolls down the link page to the position where the search term "search" is located and places the cursor 56 at the position of the search term.

Thus, even when a search term entered in the search term field 51 is not shown in an initial image displayed in the display field 55, the CPU 20 moves the cursor 56 to the search term in response to an operation of the number keys 31 of the remote controller 3. This arrangement permits the user to sufficiently look for the search term in the link page image by operating an appropriate one of the operating elements assigned to the search term, which are represented by the operating element images 112.

Note that when any of the operating elements that are assigned to a search term is operated, the CPU 20 moves the cursor 56 to the search term regardless of whether the position of the search term is set as one of the link portions 53.

Referring back to FIG. 6, if an operation of one of the arrow keys 32 of the remote controller 3 is detected at STEP F115, the CPU 20 proceeds to STEP F116. At STEP F116, the CPU 20 moves the cursor 56 to each of the link portions 53 displayed in the display field 55 in accordance with directions represented by the arrow keys 32.

For example, when it is detected that the DOWN key of the arrow keys 32 is operated while the image of FIG. 12 is displayed, the CPU 20 moves the cursor 56 to a term "web page" as the first one of the link portions 53 in the display field 55. Further, when it is detected that the DOWN key of the arrow keys 32 is pressed again, the CPU 20 moves the cursor 56 to a term "PC" as the second one of the link portions 53.

For one of the link portions 53 which is contained in the link page but is not currently shown in the display field 55, the CPU 20 also moves the cursor 56 to the one of the link portions 53 by scrolling the link page image in response to an operation of one of the arrow keys 32.

However, it can also be configured such that any operation on the arrow keys 32 is invalid when there are no link portions 53 to which the cursor 56 is moved within a range of the link page image which is currently displayed, and thus the processing of moving the cursor 56 with scrolling is not executed.

In addition, when two of the link portions 53 are provided on the same line of a text of the link page image, the CPU 20 moves the cursor 56 to each of the two link portions 53 on the same line in response to an operation of the RIGHT key or the LEFT key of the arrow keys 32 of the remote controller 3. Thus, the CPU 20 determines a destination to which the cursor 56 is moved in accordance with a direction corresponding to one of the arrow keys 32 that is operated by the user.

Note that the operation performed on the arrow keys 32 is not limited to causing the cursor 56 to move to each of the link portion 53. It is also possible that the arrow keys 32 are used to simply move the cursor 56 in the vertical and horizontal directions on the screen.

In the processing of STEP F116, as described above, the CPU 20 performs the cursor movement processing in accordance with operations of the arrow keys 32.

At STEP F119, if it is detected that the browser key 34 of the remote controller 3 is pressed, the CPU 20 terminates the browser processing.

On the other hand, at STEP F117, if an operation of the SET key 33 of the remote controller 3, the CPU 20 proceeds to STEP F118. At STEP F118, the CPU 20 performs processing on the basis of a position to which the cursor 56 is moved.

Specifically, for example, if the cursor 56 is located at one of the link portions 53 at a time when the SET key 33 is pressed, the CPU 20 accesses the corresponding link page and displays an image of the link page. In addition, if the cursor 56 is located at the search term field 51 at a time when the SET key 33 is pressed, the CPU 20 initiates processing of character entry in the search term field 51. On the other hand, when the SET key 33 is pressed while the cursor 56 is located at an element other than the position related to predetermined processing as described above, such as the link portions 53 and the search term field 51, the operation on the SET key 33 is invalid.

As described above, each of the operating elements that are assigned to the search terms is operated on the screen showing information content of the web page (e.g., a specific key on the remote controller 3 is pressed), as illustrated in FIG. 11. In response to the operation, the CPU 20 indicates to the user the position of each of the search terms using the cursor 56. This arrangement permits the user to easily find each of the search terms contained in the information content displayed in the display field 55.

In other words, the user can easily find a desired search term contained in displayed information content even in a situation where browsing is to be performed using the remote controller 3. This reduces the amount of operations to be performed by the user.

In addition, as described above, operating elements corresponding to search terms are presented by the operating element images 112 on the screen. This arrangement permits the user to easily recognize a key to be operated, and thus increasing operability.

According to known techniques, to find a search term that is contained in information content presented on a screen but is not currently displayed on the screen, a user has to scroll down or up the screen to find the search term, which involves much labor. However, in the above example, cursor movement is performed in conjunction with scrolling to display each search term that is not currently displayed on the screen, in response to an operation of an operating element assigned to the search term. This also increases operability in finding search terms.

In the following, a second example of processing implemented using a browser function according to an embodiment of the present invention will be described.

Figure 15:
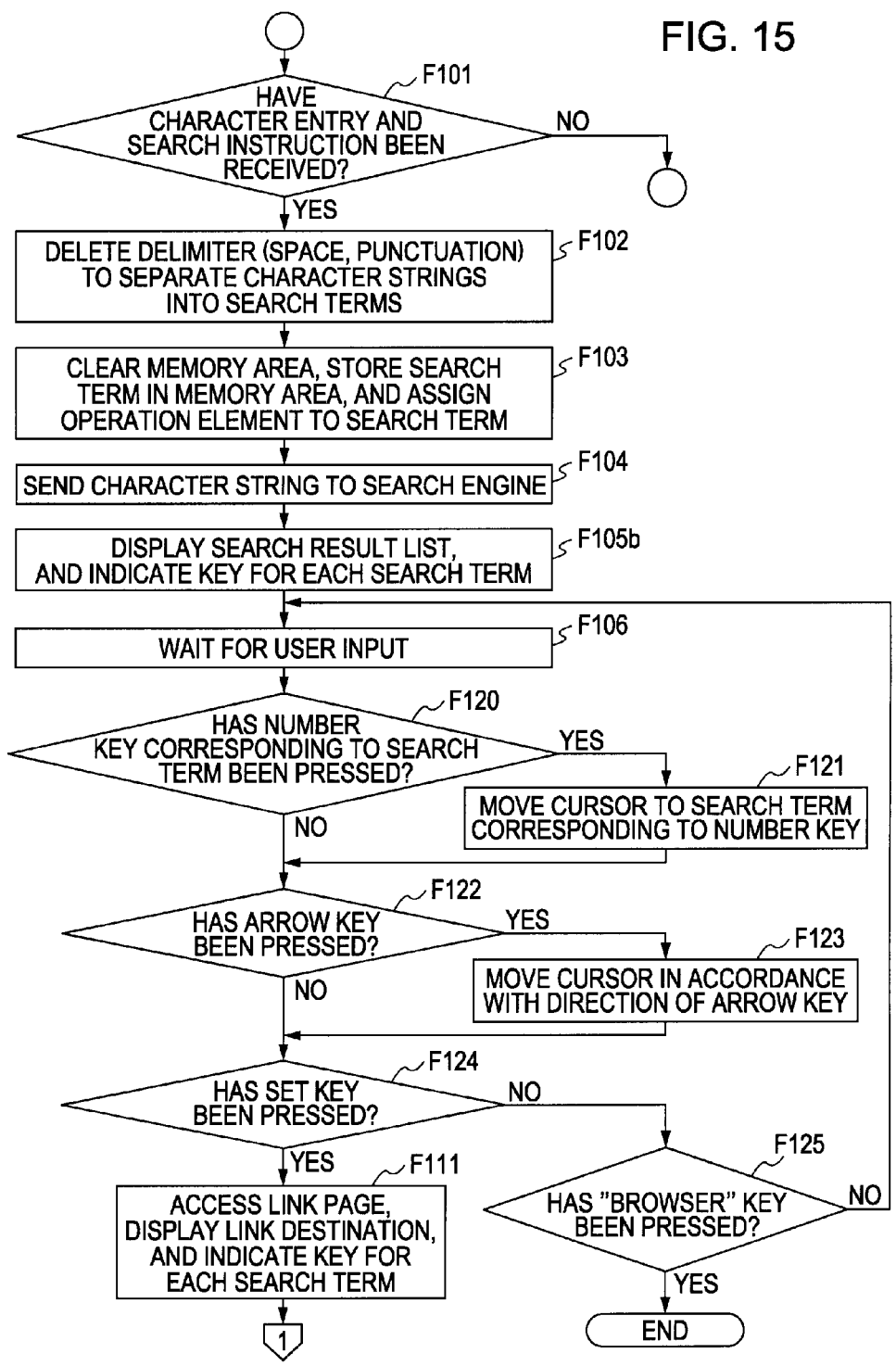
FIG. 15 is a flowchart illustrating the second example of processing according to an embodiment of the present invention.

FIG. 15 is a flowchart illustrating a processing procedure as the second example of processing to be performed by the CPU 20 when a browser function is executed. In the first example of processing of the CPU 20 described above, a link page is selected from a search result list. Then, an operation function of each operating element assigned to a search term is executed when an image of the link page is displayed. However, in the second example described below, the operation function of each operating element assigned to a search term can also be executed while a user views a search result list, as well as while the user views an image of a link page selected by a user from the search result list.

In FIG. 15, the same reference numerals as those in FIG. 5 are used to designate similar processing steps, and thus the descriptions thereof will be omitted. In the processing of STEP F101 to F104, search terms are determined on the basis of user entry of the search terms. Then, operating elements of the remote controller 3 are assigned to the search terms, and then the search terms are transmitted to a search engine.

Subsequently, at STEP F105b, the CPU 20 displays on the display unit 23 information on a result of searching performed in the search engine. Thus, a list containing a plurality of web pages or the like that are found as the result of the searching is displayed on the display unit 23, for example, as illustrated in FIG. 16.

Figure 16:
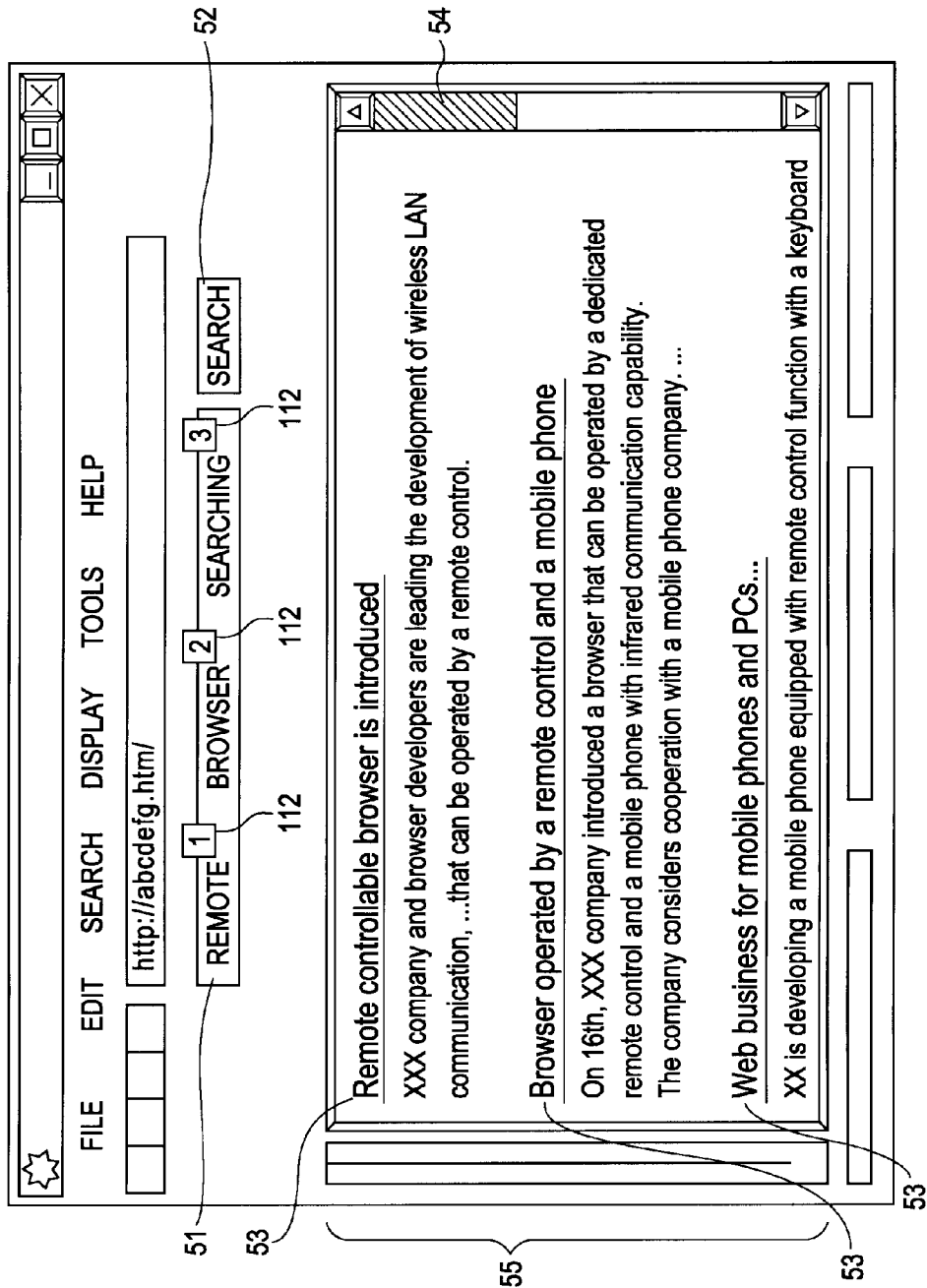
FIG. 16 illustrates an example of display of a search result list in the second example of processing according to an embodiment of the present invention.

At this time, the CPU 20 indicates the operating element images 112 in the search term field 51 together with the search terms entered by the user, as illustrated in FIG. 16. Also in this example, the operating element images 112 can be indicated as translucent portions and displayed so as to be partially superimposed on the corresponding search terms, similarly to the case described with reference to FIG. 13. Thus, the operating element images 112 are displayed so that the user can recognize the operating elements that are assigned to the search terms while viewing the search result list.

At STEP F106, the CPU 20 waits for an operation input by the user while displaying the image illustrated in FIG. 16, for example. At this time, the CPU 20 monitors an operation of the user on the number keys 31, the arrow keys 32, the SET key 33, and the browser key 34 of the remote controller 3.

If, at STEP F120, the CPU 20 detects an operation of one of the number keys 31 that have been assigned to the search terms in STEP F103, the CPU 20 proceeds to STEP F121. At STEP F121, the CPU 20 moves the cursor 56 on the screen in accordance with the search term that is assigned with the one of the number keys 31.

For example, if an operation of the "1" key of the number keys 31 is detected while the image of FIG. 16 is displayed, the CPU 20 moves the cursor 56 to the search term "remote" contained in the top one of the link portions 53, as illustrated in FIG. 17. In this case, the position of the search term "remote", which constitutes the top one of the link portions 53, is indicated to the user.

Further, if it is detected the "1" key of the number keys 31 is operated again, the CPU 20 moves the cursor 56 to another position where the search term "remote" is located. For example, as illustrated in FIG. 18, if another one of the search term "remote" is also contained in a text describing the content of the link page corresponding to the top one of the link portions 53, the CPU 20 moves the cursor 56 to the position of the other one of the search term "remote".

That is, when any of the operating elements assigned to the search terms is operated, the CPU 20 moves the cursor 56 to the corresponding one of the search terms regardless of whether the search terms are included in the link portions 53.

Likewise, the CPU 20 moves the cursor 56 in response to an operation of another one of the number keys 31 that are assigned to the search terms, to the corresponding one of the search terms. For example, when it is detected that the "2" key of the number keys 31 is operated at STEP F120, the CPU 20 moves the cursor 56 to the search term "browser" at STEP F121. In the case of the displayed content illustrated in FIG. 16, the search term "browser" is contained in the top one of the link portions 53 in the display field 55. Thus, the CPU 20 moves the cursor 56 to the search term "browser" contained in the top one of the link portions 53. In addition, when it is detected that the "3" key of the number keys 31 is operated at STEP F120, the CPU 20 moves the cursor 56 to the search term "searching" at STEP F121. For example, if the search term "searching" is included in the search result list but not currently shown in the display field 55, as illustrated in FIG. 16, the CPU 20 performs cursor movement in conjunction with scrolling.

Moreover, at STEP F122, if an operation of one of the arrow keys 32 of the remote controller 3 is detected, the CPU 20 proceeds to STEP F123. At STEP F123, the CPU 20 moves the cursor 56 on the screen in accordance with the direction corresponding to the one of the arrow keys 32. For example, if the DOWN key of the arrow keys 32 is pressed while the image illustrated in FIG. 16, for example, is displayed, the CPU 20 moves the cursor 56 to the top one of the link portion 53.

Unlike the case where one of the number keys 31 is operated, cursor movement in a case where any of the arrow keys 32 is operated is intended to indicate the position of each of the link portions 53. Thus, the CPU 20 presents the cursor 56 over each of the link portions 53.

Further, if an operation of the browser key 34 is detected at STEP F125, the CPU 20 terminates the browser processing.

On the other hand, if an operation of the SET key 33 of the remote controller 3 is detected at STEP F124, the CPU 20 proceeds to STEP F111. In this processing of STEP F124, similarly to the first example described above, it is detected that the SET key 33 is pressed while the cursor 56 is positioned at one of the link portions 53.

Thus, at STEP F111, similarly to the STEP F111 of the first example of the processing described above, the CPU 20 recognizes that the one of the link portions 53 which is currently indicated by the cursor 56 has been selected and set by the user. Then, the CPU 20 accesses a corresponding link page and displays an image of the link page. For example, the CPU 20 displays the image illustrated in FIG. 11. This processing of STEP F111 is similar to that in the first processing example. Thus, also in this example, the operating element images 112 that represent the operating elements assigned to the search terms are displayed in the search term field 51.

The cursor 56 may be positioned at a part of one of the link portions 53, as illustrated in FIG. 17. Also in this case, the CPU 20 recognizes that the one of the link portion 53 that contains the part at which the cursor 56 is positioned is selected by the user. Thus, in response to an operation of the SET key 33, the CPU 20 can access a corresponding link page. In contrast, it can also be configured such that the operation of the SET key 33 is invalid when the cursor 56 is positioned at only a part of one of the link portions 53.

Subsequently, the procedure proceeds to STEP f112. Specifically, the cursor 56 is moved to a position of each of the search terms in accordance with an operation of a corresponding operating element (a corresponding one of the number keys 31) in a link page image, similarly to the first processing example.

As described in the foregoing, in the second processing example, the operating element images 112 are displayed in the processing of F105b as well as in the processing of STEP F111. In addition, the cursor 56 is moved to each of the search terms in accordance with an operation of a corresponding one of the operating elements that are assigned to the search terms in the processing of STEP F120 and F121.

Thus, in the second processing example, an operation function of each of the operating elements assigned to the search terms is executed even when a user views a search result list as well as when the user views an image of a link page selected by the user from the search result list.

This arrangement allows a user to easily find a search term in an image even while viewing a search result list before selecting a link page from the list, without viewing actual images of listed link pages, and this increases user convenience in viewing search results.

In the foregoing, the embodiments of the present invention are described. However, the present invention may have various modifications.

In the foregoing, the case where finding of search terms in a link page is facilitated using operating elements assigned to the search terms is described in the first example. In addition, the case where finding of search terms in a link page as well as a search result list is facilitated using operating elements assigned to the search terms is described in the second example. However, it is also possible that search terms are looked for only when a user views a search result list using operating elements assigned to the search terms.

In the above embodiment, the case is described where a user performs operations using the remote controller 3 for browsing on the television receiver 1. However, another apparatus configuration can be applied to the present invention. For example operating element provided on the housing (panel) of the television receiver 1 instead of the remote controller 3.

In addition, when browsing is performed using devices such as mobile phones or PDAs (personal digital assistants), the operating elements of these devices can be assigned to search terms, so that positions of the search terms are indicated in accordance with operations on the operating elements.

Further, as described above, various operating elements operating elements that are assigned to search terms can be employed. When operating elements other than the number keys are employed so as to be assigned to search terms, various indication manners of operating element images can be applied. For example, input keys for kana characters or alphabets can be assigned to the search terms. When alphabet input keys are employed, images of alphabets such as "a" and "b" can be used as operating element images. Moreover, images depicting operation keys can be used as operating element images.

Needless to say, it is also possible that arrow keys are assigned to search terms.

Furthermore, the same operating element can be assigned to different search terms. In the above embodiment, the "1" key, the "2" key, and the "3" key of the number keys 31 of the remote controller 3 are sequentially assigned to the three search terms "remote", "browser", and "searching", respectively. However, it is also possible that the "1" key of the number keys 31 is assigned to the search terms "remote" and "browser", and the "2" key of the number keys 31 is assigned to the search term "searching".

In this case, if an operation of the "1" key is detected, the CPU 20 sequentially moves a cursor to either the search term "remote" or "browser".

It is further possible that the same operating element is assigned to all search terms. For example, the "1" key of the number keys 31 can be assigned to all of the search terms "remote", "browser", and "searching". In this case, when the "1" key is pressed, the CPU 20 sequentially moves the cursor to each of the three search terms.

In the above embodiment, an environment where mice and keyboards for personal computers are not used or not available is described. However, even when a mouse or the like is used, the embodiments of the present invention can be implemented. For example when browsing is performed on a personal computer, specific keys of a keyboard device are assigned to search terms, and a cursor is moved to each of the search terms in response to an operation of each of the keys.

The program according to an embodiment of the present invention implements the browser function described above. The program is activated by a processor such as the CPU 20, and the processor operates on the basis of the program so as to execute processing such as described with reference to FIG. 5, FIG. 6, and FIG. 15.

The program can be stored beforehand in the memory 21, for example.

The program according to an embodiment of the present invention can also stored beforehand in ROMs in microcomputers having CPUs in devices such as television receivers, tuners, mobile phones, PDAs, and personal computers. Alternatively, the program can be stored beforehand in built-in recording media such as internal memories and HDDs (hard disc drives), from which these devices can read the program.

Further, the program can also be temporarily or eternally stored (recorded) in removable media such as flexible disks, CD-ROMs (compact-disc read-only memories), MO (magneto-optical) discs, DVDs (digital versatile discs), Blu-ray Discs, magnetic disks, semiconductor memories, and memory cards. Such removable recording media can be provided as so-called package software.

Moreover, the program according to an embodiment of the present invention can be installed into a personal computer from a removable medium, and can also be downloaded from a download site via a network such as a LAN (local area network) and the Internet.

With the above program or recording medium having stored the program therein, apparatuses which implement the functions as described in the above embodiments can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method comprising:
   inputting a plurality of search terms into a search term field;
   executing a search based upon the inputted search terms;
   obtaining a list of search results;
   selecting and opening a document from the search results;
   assigning an operating element of an operation input device to each of the inputted search terms;
   displaying the document containing the search terms on a screen; and
   while displaying the document on the screen and in response to operating the operating element that corresponds to one of the search terms, indicating a position of the corresponding search term in the document.

2. A non-transitory computer-readable medium storing computer readable instructions thereon that when executed by an information processing apparatus cause the information processing apparatus to perform a method comprising:
   inputting a plurality of search terms into a search term field;
   executing a search based upon the inputted search terms;
   obtaining a list of search results;
   selecting and opening a document from the search results;
   assigning an operating element of an operation input device to each of the inputted search terms;
   displaying, on a screen, the document containing the search terms; and
   while displaying the document on the screen and in response to operating the operating element that corresponds to one of the search terms, indicating a position of the corresponding search term in the document.

3. The program non-transitory computer-readable medium of claim 2, wherein each of the assigned operating elements has a corresponding operating element image and the search terms are displayed together with the corresponding operating element images in the search term field.

4. The non-transitory computer-readable medium of claim 3, wherein each of the operating element images is displayed adjacent to the corresponding search term.

5. The non-transitory computer-readable medium of claim 3, wherein each of the operating element images is displayed partially superimposed on the corresponding search term.

6. The non-transitory computer-readable medium of claim 3, wherein each of the operating element images is a translucent image and is displayed adjacent to the corresponding search term or partially superimposed on the corresponding search term.

7. The non-transitory computer-readable medium according to claim 3, wherein each of the corresponding operating element images is individually enclosed by a different frame.

8. The non-transitory computer-readable medium of claim 2, wherein the obtained search results are based on search processing using the search terms.

9. The non-transitory computer-readable medium of claim 2, wherein, when indicating the position of the corresponding search term in the document, a cursor is displayed at the position where the corresponding search term is presented in the document.

10. The non-transitory computer-readable medium according to claim 2, wherein the operation input device is a remote controller and the operating element is a key of the remote controller.

11. The non-transitory computer-readable medium according to claim 2, wherein the operating elements of the operation input device are sequentially assigned to the corresponding search terms.

12. An information processing apparatus comprising a non-transitory computer-readable medium storing computer readable instructions thereon that when executed performs a method comprising:
   inputting a plurality of search terms into a search term field;
   executing a search based upon the inputted search terms;
   obtaining a list of search results;
   selecting and opening a document from the search results;
   assigning an operating element of an operation input device to each of the inputted search terms;
   displaying the document containing the search terms on a screen; and
   while displaying the document on the screen and in response to operating the operating element that corresponds to one of the search terms, indicating a position of the corresponding search term in the document.

* * * * *